US009995837B2

(12) United States Patent
Collins

(10) Patent No.: US 9,995,837 B2
(45) Date of Patent: Jun. 12, 2018

(54) APPARATUS AND METHODS OF EXTRACTING REFLECTIONS FROM ACOUSTIC ARRAY DATA

(71) Applicant: Halliburton Energy Services, Inc., Houston, TX (US)

(72) Inventor: Mark V. Collins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 14/772,214

(22) PCT Filed: Nov. 7, 2014

(86) PCT No.: PCT/US2014/064622
§ 371 (c)(1),
(2) Date: Sep. 2, 2015

(87) PCT Pub. No.: WO2016/073003
PCT Pub. Date: May 12, 2016

(65) Prior Publication Data
US 2016/0291189 A1 Oct. 6, 2016

(51) Int. Cl.
*G01V 1/50* (2006.01)
*G01V 1/40* (2006.01)
*E21B 49/00* (2006.01)
*E21B 47/10* (2012.01)
(Continued)

(52) U.S. Cl.
CPC ............. *G01V 1/50* (2013.01); *E21B 47/101* (2013.01); *E21B 49/00* (2013.01); *G01V 1/36* (2013.01); *G01V 1/40* (2013.01); *E21B 47/14* (2013.01); *G01V 2210/54* (2013.01)

(58) Field of Classification Search
CPC ............ G01V 1/50; E21B 49/00; E21B 47/14
See application file for complete search history.

(56) References Cited

U.S. PATENT DOCUMENTS

| 5,971,095 | A | * | 10/1999 | Ozbek | .................... | G01V 1/364 181/112 |
| 8,542,553 | B2 | * | 9/2013 | Wang | ....................... | G01V 1/46 367/34 |
| 2004/0122595 | A1 | | 6/2004 | Valero | | |

(Continued)

OTHER PUBLICATIONS

"International Application Serial No. PCT/US2014/064622, International Search Report dated Jul. 23, 2015", 4 pgs.
(Continued)

*Primary Examiner* — Luke D Ratcliffe
*Assistant Examiner* — Amie M Ndure
(74) *Attorney, Agent, or Firm* — Haynes and Boone, LLP

(57) ABSTRACT

Various embodiments include apparatus and methods to extract reflections from acoustic array data collected from a receiver array. A beam-former can be generated to detect a reflection wave in the presence of a direct wave identified from collected waveforms, where the beam-former can be correlated to receiver and depth for the array. The direct wave and the reflection wave can be separated to extract the reflection wave, where the separation is correlated to receiver and depth for the array. The extracted reflected wave can be used to image and/or analyze entities associated with the borehole. Additional apparatus, systems, and methods are disclosed.

24 Claims, 16 Drawing Sheets

(51) Int. Cl.
*G01V 1/36* (2006.01)
*E21B 47/14* (2006.01)

(56) References Cited

U.S. PATENT DOCUMENTS

| | | | |
|---|---|---|---|
| 2005/0058021 A1* | 3/2005 | Feintuch | G01S 15/04 367/99 |
| 2007/0097788 A1* | 5/2007 | Tang | G01V 1/28 367/52 |
| 2008/0130409 A1 | 6/2008 | Leggett, III et al. | |
| 2010/0309751 A1* | 12/2010 | Lerro | G01S 15/003 367/99 |
| 2011/0188345 A1* | 8/2011 | Wang | G01V 1/46 367/34 |
| 2012/0147702 A1 | 6/2012 | Valero et al. | |
| 2013/0286778 A1* | 10/2013 | Kisner | G01N 29/00 367/35 |
| 2014/0056101 A1 | 2/2014 | Vu et al. | |

OTHER PUBLICATIONS

"International Application Serial No. PCT/US2014/064622, Written Opinion dated Jul. 23, 2015", 5 pgs.

\* cited by examiner

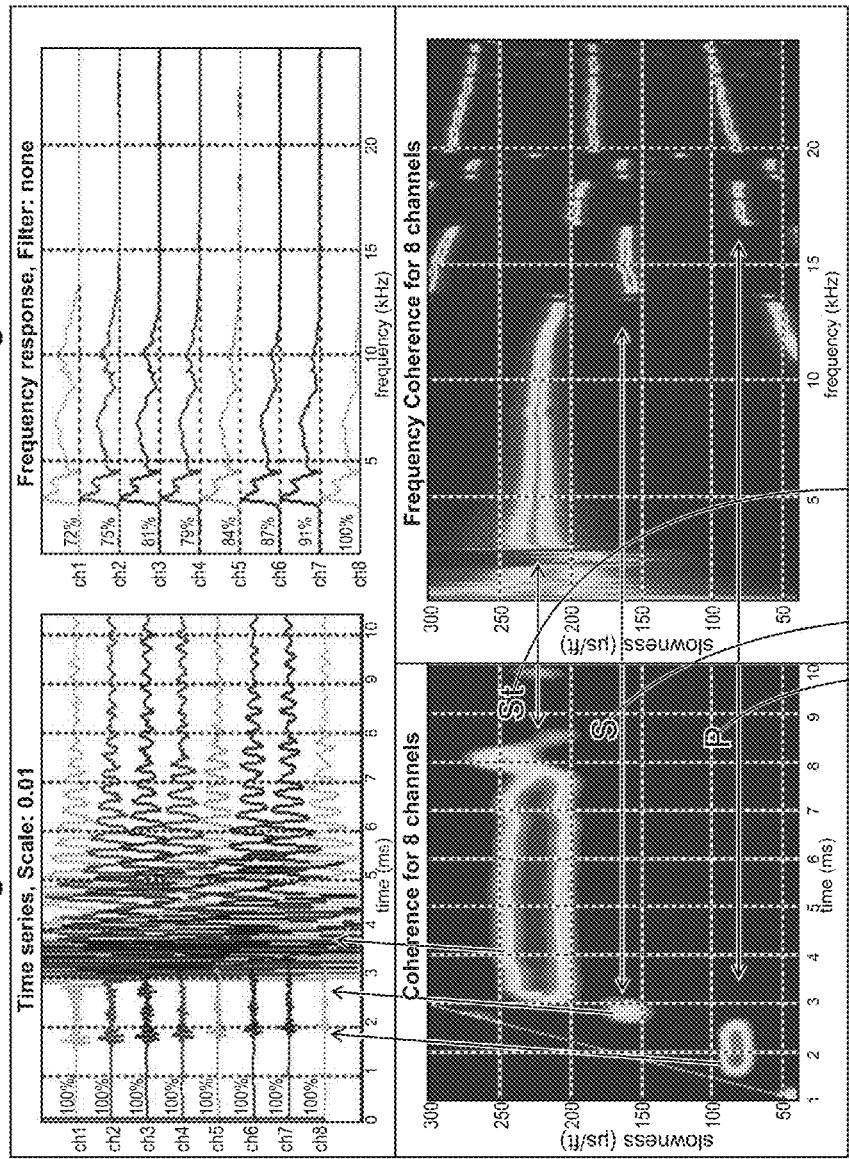

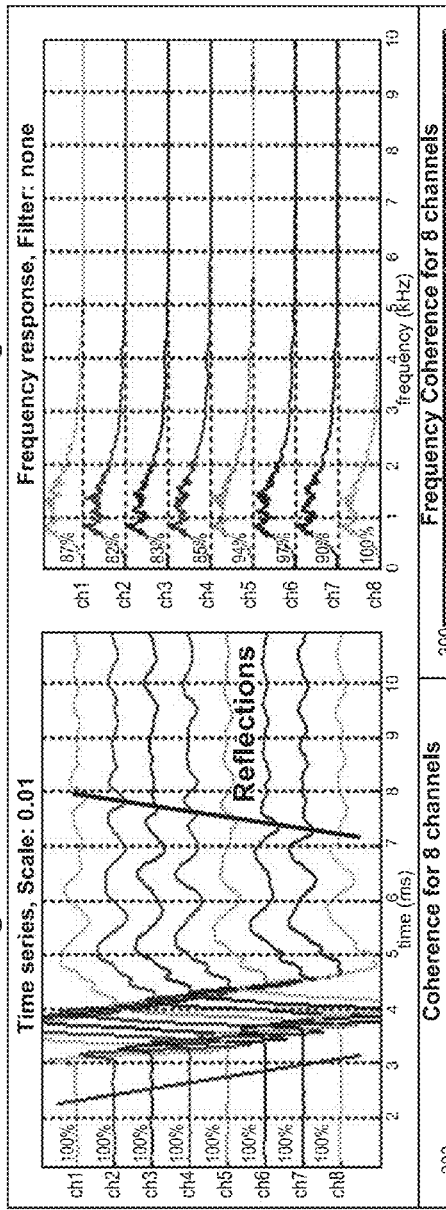
Fig. 5A
Fig. 5B
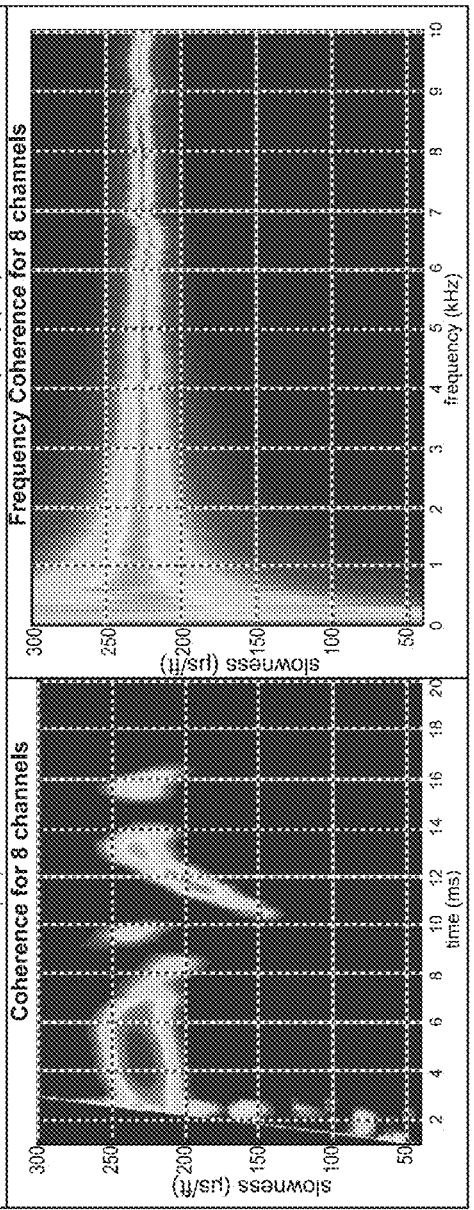
Fig. 5C
Fig. 5D

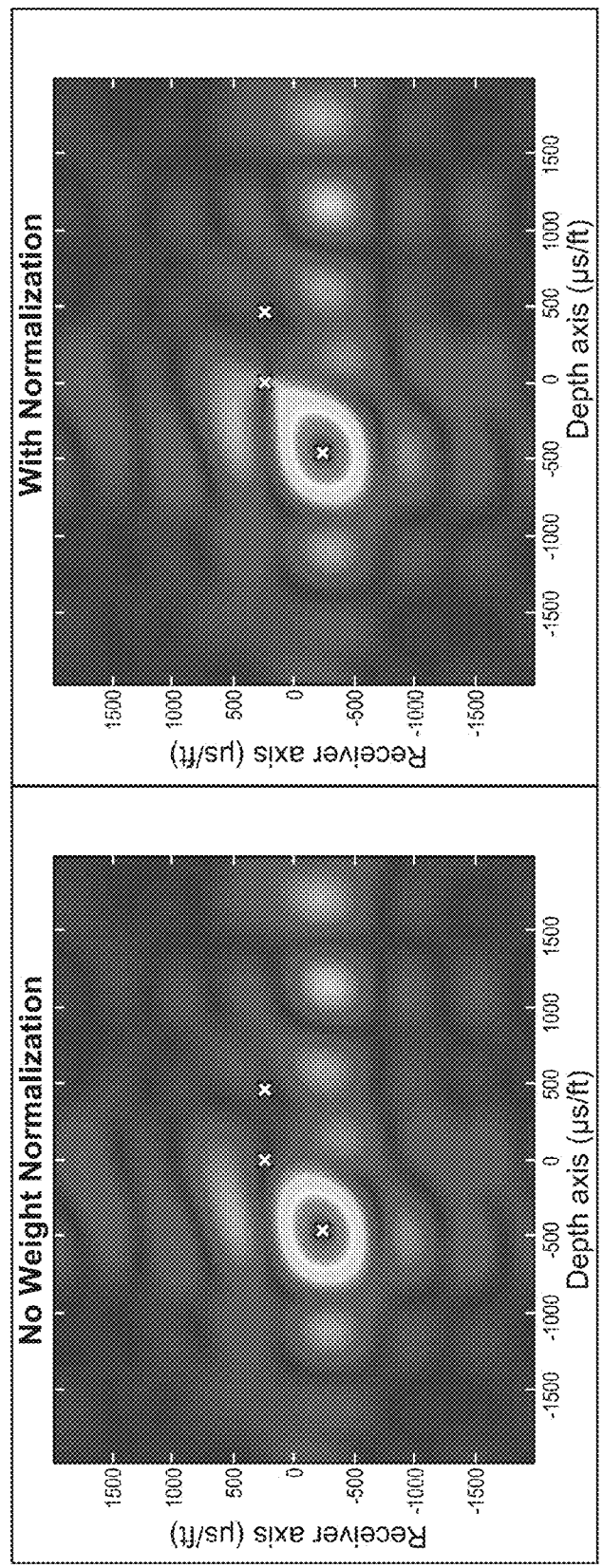

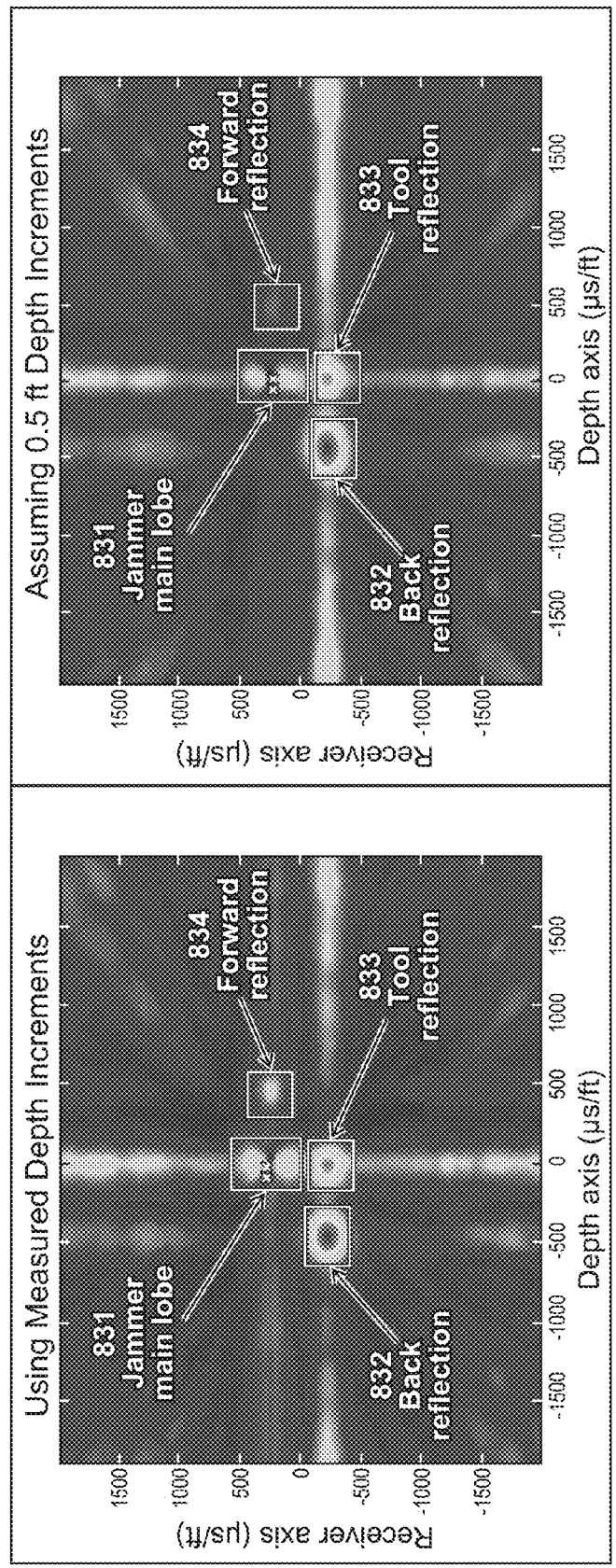

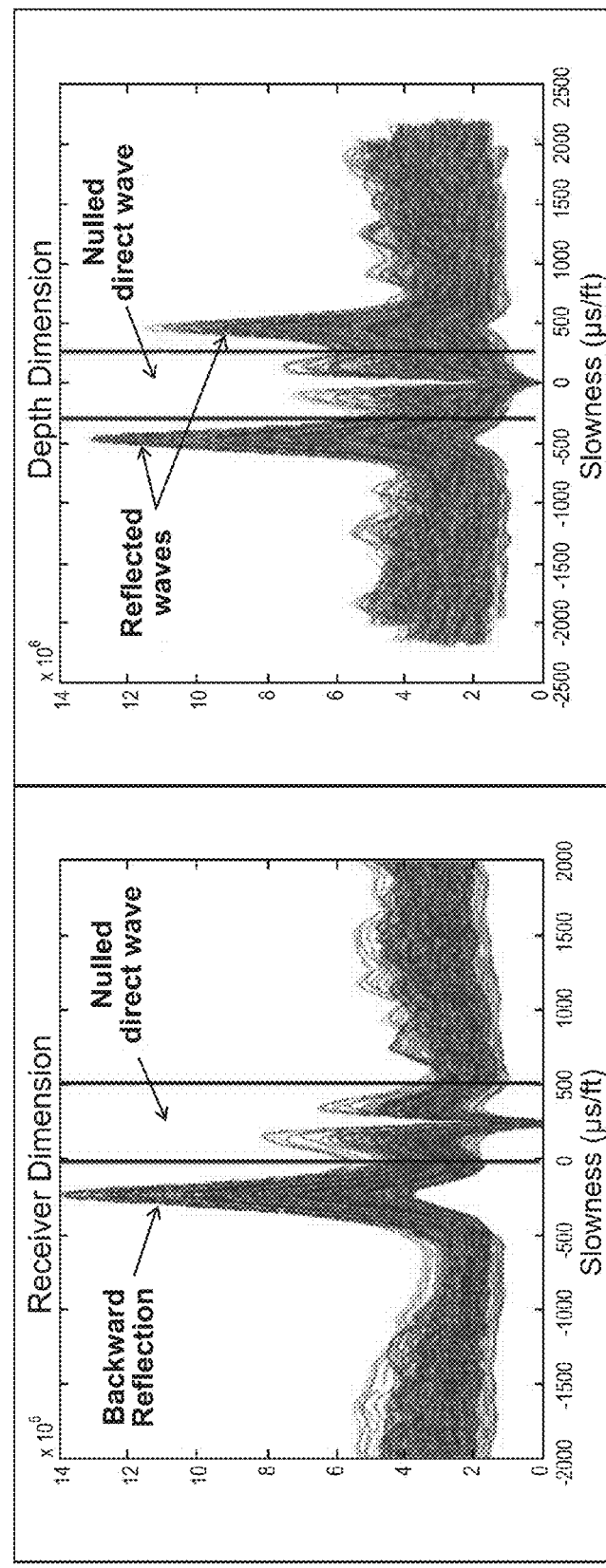

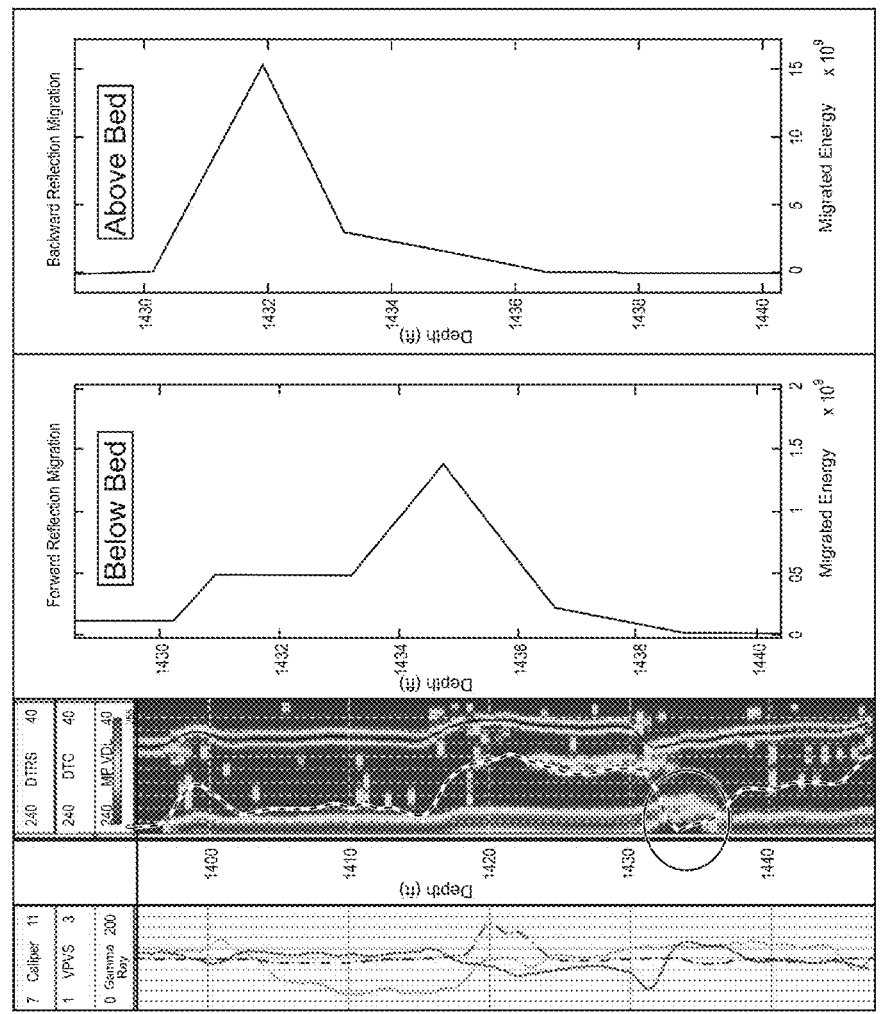

APPARATUS AND METHODS OF EXTRACTING REFLECTIONS FROM ACOUSTIC ARRAY DATA

PRIORITY APPLICATIONS

This application is a U.S. National Stage Filing under 35 U.S.C. § 371 from International Application No. PCT/US2014/064622, filed on 7 Nov., 2014, which application is incorporated herein in its entirety.

TECHNICAL FIELD

The present invention relates generally to apparatus and methods related to measurements and analysis of data with respect to oil and/or gas exploration.

BACKGROUND

In acoustic sensing of subterranean formations, a transmitting source in the borehole can be used to create pressure waves that travel through the formation and are recorded at a number of receivers. The pressure wave-train can be very complex. For example, in a fast formation the recorded wave-train from a monopole source may consist of a compressional wave, a shear wave, a Stoneley wave, and a pseudo-Rayleigh wave. These waves are referred to as primary or "direct" waves. In conventional acoustic processing, receiver waveforms are processed using semblance techniques to extract formation properties from the direct waves such as compressional and shear wave velocities.

In a borehole environment, the wave-train also contains coherent reflection events from bedding planes, planar fractures, and clean borehole breakouts. These events are referred to as 'secondary' waves because they are usually much smaller than the direct waves. In addition to the secondary waves, incoherent scattering events occur due to borehole rugosity, road noise or drilling noise, and scattering from complex geological structures such as non-planar fracture networks. In conventional acoustic processing, the reflections and scattering are treated as noise and the semblance techniques are applied to reduce their effect on the measurement of the formation properties from the direct waves. Known techniques can include the use of one-dimensional (1D) wave separation in the frequency domain to estimate the direct waves. The wave separation treats the direct waves as the signal and the reflected waves as incoherent noise, which is averaged out during the wave separation. The estimated direct waves are subtracted from the original waveforms to estimate the reflected waves. In such techniques, uniform depth spacing is also assumed and aliasing errors are ignored. This subtraction method can suffer from large residual errors in the reflected wave estimate because the reflections are typically much smaller than the direct waves. The residual errors are reduced after wave separation by stacking the waveforms in the time domain using an expected time of arrival estimate from ray tracing theory. However, the usefulness of such measurements and analysis may be related to the precision or quality of the information derived from such measurements.

BRIEF DESCRIPTION OF THE DRAWINGS

FIGS. 4A-4D are waveforms, frequency response, and semblances from firing a broadband monopole acoustic source, according to various embodiments.

FIGS. 5A-5D are waveforms, frequency response, and semblances from firing a monopole acoustic source at low frequency, according to various embodiments.

FIGS. 7A-7B are representations of images of two-dimensional beam-space using jammer cancellation providing an example of direct Stoneley wave cancellation using the same data as for FIG. 6, in accordance with various embodiments.

FIGS. 8A-8B are representations of images of two-dimensional beam-space using jammer cancelation and stacking, in accordance with various embodiments.

FIGS. 9A-9B are representations of images of one-dimensional depth and receiver beam-spaces using jammer cancelation and stacking, according to various embodiments.

FIGS. 13A-13D are representations of forward and backward images alongside a gamma log and a visual density log of the time semblance for a broadband monopole source, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Secondary arrivals in acoustic processing contain useful information and may be used to image the formation surrounding the borehole and identify features such as bed boundaries and planar fractures. Once identified, the fractures can be analyzed to determine their conductivity. Further, identifying and locating bed boundaries is useful for geo-steering or verifying borehole positioning. One of the biggest challenges in borehole acoustic imaging is detecting and extracting the desired secondary reflections from the dominant direct arrivals. Apparatus and methods disclosed herein can provide techniques to enhance detection and extraction of secondary reflections from direct wave arrivals and background scattering in acoustic sensing of subterranean formations.

Figure 1:
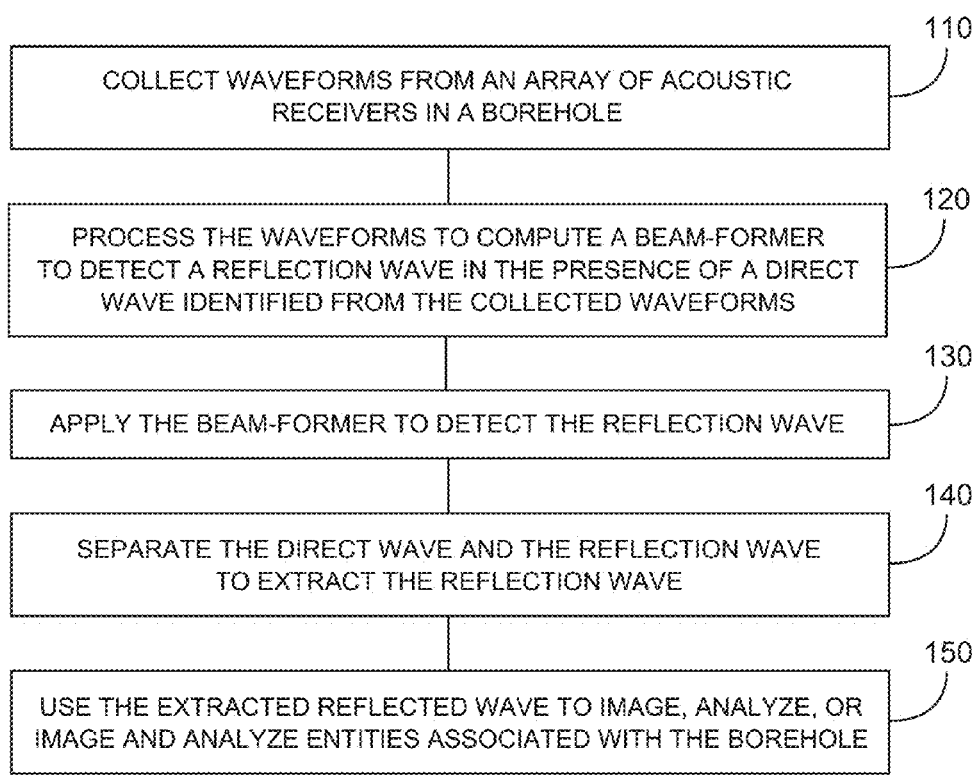
FIG. 1 is a flow diagram of features of an example method of extracting reflections from acoustic array data, according to various embodiments.

FIG. 1 shows features of an embodiment of an example method of extracting reflections from acoustic array data. At 110, waveforms are collected from an array of acoustic receivers in a borehole. The waveforms can be categorized by a receiver index and a depth index for the array, where the array can have a number of acoustic receivers at a number of depths. Indexing by receiver and depth provides a mechanism to define a two-dimensional (2D) space as a beam space to process and analyze data provided by the waveforms. A number of different types of transmitters may be used to initiate the measurements. A monopole acoustic source or a dipole acoustic source can be used to provide the collected waveforms.

At 120, the waveforms are processed to compute a beam-former to detect a reflection wave in the presence of a direct wave identified from the collected waveforms. A beam-former is a signal processing instrumentality that combines elements in an array to achieve selectivity to waveforms associated with the signal processing. The beam-former can be correlated to receiver and depth for the array defining a beam-space. A 2D slowness can be based on measuring slowness in two dimensions. Slowness is the amount of time for a wave to travel a given distance, proportional to the reciprocal of velocity. Consider a single receiver that can be followed at different depths such that a secondary wave, which bounces off a fracture or other obstruction as the receivers are moving, appears at different arrival times based on depth. One can view the different arrival times as an effective slowness, that is, movement relative to the fracture that causes an apparent slowness or an apparent velocity for the wave. Also, at a given depth, the wave passes through all the receivers that are disposed on the acoustic tool at different depths relative to each other, which is another dimension giving rise to a slowness across the receivers at a given tool depth. A beam-former can be generated relative to a 2D slowness grid of a receiver slowness and a depth slowness, as opposed to only considering the depth dimension or only considering the receiver dimension at a fixed depth.

Collecting the waveforms and processing the waveforms can include transforming the collected waveforms from the time domain to the frequency domain; selecting a frequency band; detecting slowness of the direct wave as a function of frequency with respect to receiver slowness and depth slowness; and computing weights of the beam-former using the slowness of the direct wave. Selecting a frequency band can be conducted to analyze a frequency band that includes a direct wave of interest such that interference from other modes at different frequencies can be reduced or avoided. For example, in a measurement in which more than one type of mode is generated such as a compressional wave, shear wave, and a Stoneley wave, but at different frequencies, the frequency band relative to the direct wave of interest, for instance the Stoneley wave, can be selected for analysis.

At 130, the beam-former is applied to detect the reflection wave. Applying the beam-former can include computing an inner product of the beam-former weights and a vector of the waveforms correlated to receiver slowness and depth slowness. Applying the beam-former to detect the reflection wave can include stacking the beam-space over frequency. The transmitters providing the sources, from which the collected waveforms arise, can be operated at different frequencies. With the collected waveforms transformed at independent frequencies, slowness as a function of frequency can be scaled to stack up in frequency. Adding in the frequency dimension provides another dimension to processing with respect to receivers and depth.

At 140, the direct wave and the reflection wave are separated to extract the reflection wave, after applying the beam-former to detect the reflection waves. The separation can be correlated to receiver and depth for the array. Receiver slowness and depth slowness can be used. An objective function model can be generated knowing the 2D slowness and the objective function can be minimized to determine the frequency response of the reflected wave. An objective function is a relationship to be optimized according to constraints, where variables of the relationship are chosen to minimize or maximize the objective function. The minimization or maximization may be conducted using nonlinear computer-based techniques. The 2D depth-receiver array can be provided by a plurality of receivers at each of a plurality of planes along a length of the tool, and at a plurality of tool depths.

Separating the direct wave and the reflection wave can include applying a least squares inversion process. Separating the direct wave and the reflection wave can include, for a reference depth, generating a frequency response using slowness of the direct and reflected waves such that the frequency response is a frequency response vector having direct wave and reflected wave components ordered according to power. Generating the frequency response can include ordering the reflected wave components based on values of the beam-space at reflection peaks. In various embodiments, processing can include adjusting the frequency response vector by reducing a matrix that generates the frequency response vector, if column vectors of the matrix are nearly co-linear at a specific frequency. This adjustment can provide a mechanism to avoid making the inversion unstable at those frequencies at which column vectors of the matrix are nearly co-linear and to avoid generating errors in the waveforms.

At 150, the extracted reflected wave can be used to image, analyze, or image and analyze entities associated with the borehole. The extracted reflected wave can be used to image and/or analyze fractures. Such data may also be used to determine whether a fracture has fluids, the conductivity of the fractures, and whether the apparent fracture is actually a bedding plane. Borehole imaging can also be used to geo-steer while drilling by identifying bedding planes. This imaging allows adjustments in the drilling direction to avoid dog-legs and stay within a pay-zone. Other properties of the formation around the borehole may be evaluated.

Figure 2:
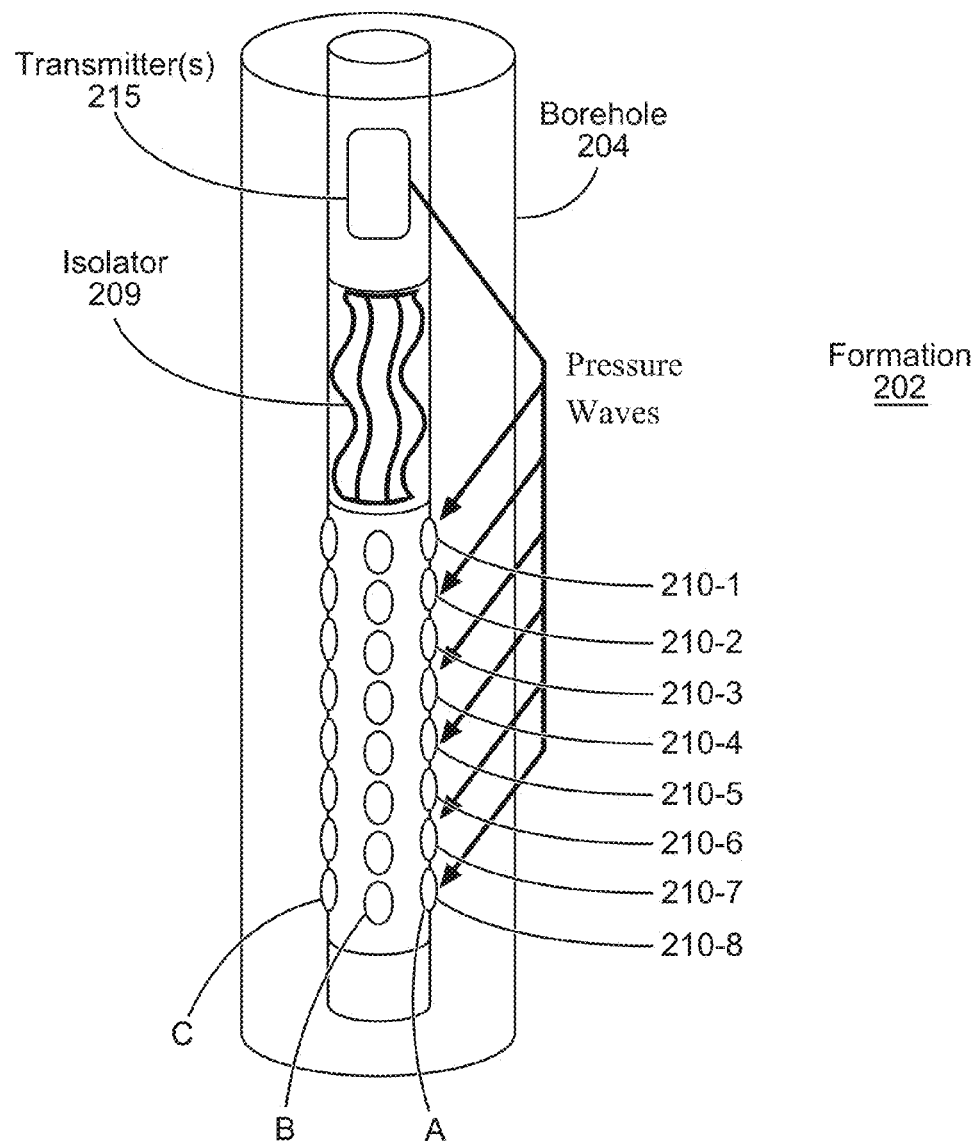
FIG. 2 is a schematic diagram of an embodiment of an example acoustic tool operable in a borehole, according to various embodiments.

FIG. 2 is a schematic diagram of an embodiment of an example acoustic tool operable in a borehole 204 surrounded by formation 202. One or more transmitters 215 may be used to generate pressure waves that travel down the borehole and are measured at two or more axially separated receiver stations. Each receiver station consists of at least one receiver. An example of a receiver configuration can include eight receiver stations 210-1 . . . 210-8 with each receiver station having four receivers equally spaced in azimuth. More or less than eight receiver stations may be used and more or less than four receivers may be used at one or more receiver stations. For convenience, the azimuthal receivers at a given length along the axis are denoted A, B, C, and D in clockwise order for the example of four receivers per receiver station (receiver D not shown in FIG. 2). An acoustic isolator 209 may be disposed between the one or more transmitters 215 and the set of eight receiver stations 210-1 . . . 210-8.

Receiver waveforms acquired by the four receivers of each receiver station 210-1 . . . 210-8 can be combined in different ways depending on the type of source excitation. When a monopole transmitter is used, the four azimuthal receivers A, B, C, and D at a receiver station can be added. In this case, the dominant mode in the combined waveform is the Stoneley wave. Another transmitter configuration that be used is a crossed-dipole transmitter configuration. In this case, two azimuthally orthogonal dipole transmitters are fired separately. For convenience, denote the dipole transmitters by X and Y. Transmitter X can be aligned with receivers A and C. Transmitter Y can be aligned with receivers B and D. Waveforms from opposing receivers can be differenced resulting in four waveforms: XX=XA−XC, XY=XB−XD, YX=YA−YC, and YY=YB−YD. XX and YY waveforms are referred to as in-line waveforms, since transmitters X and Y are aligned with receivers A and C and receivers B and D, respectively. XY and YX waveforms are referred to as cross-line waveforms, since transmitters X is orthogonal to receivers B and D and Y is orthogonal to receivers A and C. The dominant mode in the in-line waveforms is the flexural mode. The velocity of the flexural mode approaches the formation shear velocity at low frequency. The crossed-dipole transmitter configuration is useful for measuring the shear velocity in slow formations where there is no refracted shear wave. The in-line and cross-line waveforms can also be used to detect azimuthal anisotropy. The measurements may be made with respect to formation compressional slowness ($s_C$), formation shear slowness ($s_S$), and formational Stoneley slowness ($s_{St}$).

Figure 3:
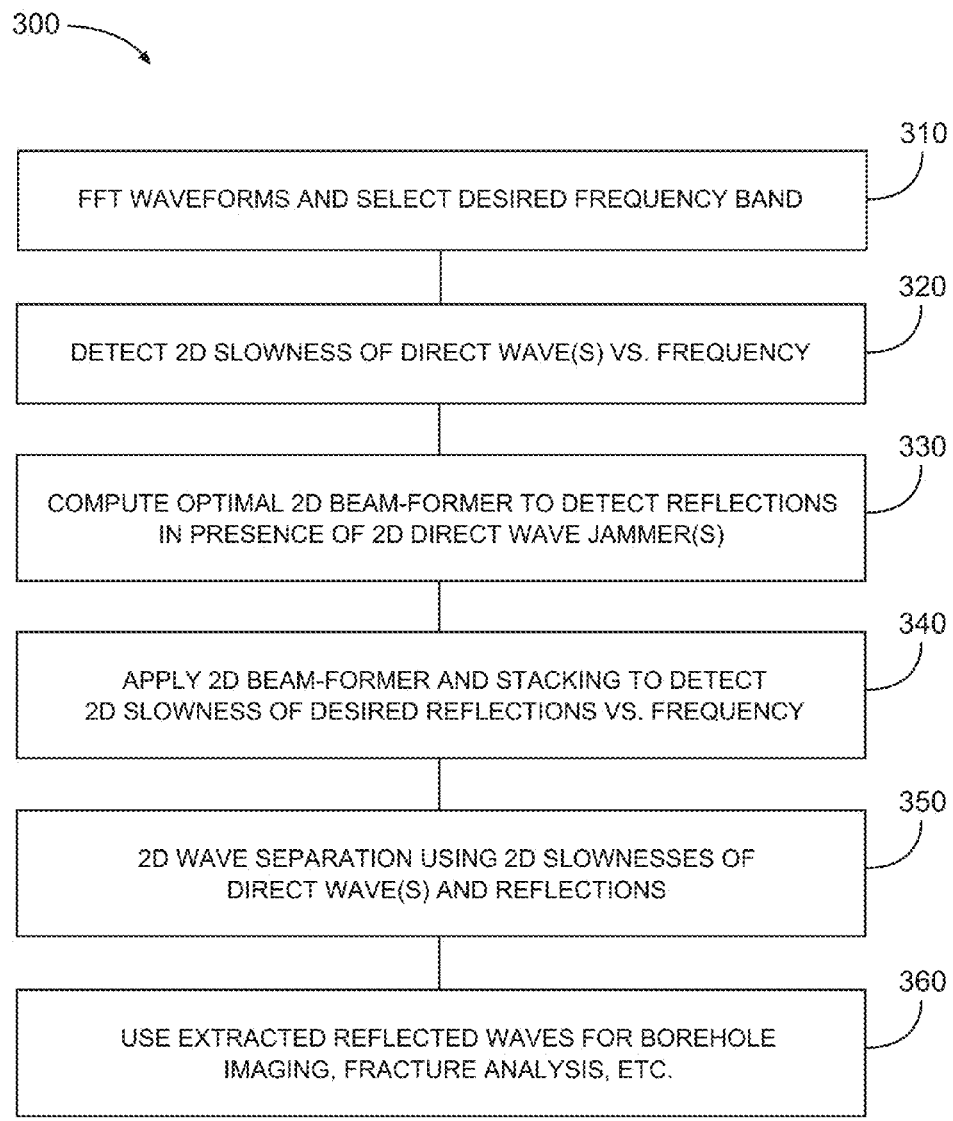
FIG. 3 is a flowchart of features of an example method to extract data for borehole analysis from reflections from acoustic array data, according to various embodiments.

FIG. 3 is a flowchart of an example embodiment of a method 300 to extract data for borehole analysis from reflections from acoustic array data. Processing can begin with waveforms collected in a two-dimensional (2D) array indexed by receiver and depth. At 310, the waveforms are Fourier transformed from the time domain to the frequency domain and a desired frequency band is selected for further processing. At 320, 2D receiver/depth slowness of one or more direct waves are determined as a function of frequency using conventional semblance techniques. At 330, an optimal 2D beam-former is computed to detect reflections in presence of one or more 2D direct wave jammers. A jammer, herein, is a direct wave of interest that masks (or jams) the reflection waves. At each frequency, the 2D slowness of the one or more direct waves can be used to compute optimal 2D beam-former weights for canceling out the one or more direct waves and detecting a particular steering vector. The particular steering vector can be used as a 2D test slowness. At 240, the 2D beam-former and stacking is applied to detect 2D slowness of the desired reflections versus frequency. The beam-former weights are applied and the beam-space is searched to locate the reflection signal steering vectors. Stacking over frequency is used to enhance the signature of the reflections. The 2D slowness of the reflections is estimated as a function of frequency. At 350, 2D wave separation is conducted using 2D slownesses of one or more direct waves and reflections. The 2D slowness of the direct waves and reflections as a function of frequency can be used by a 2D wave separation algorithm to extract the reflections. The wave separation algorithm can be stabilized with respect to aliasing at specific frequencies. At 360, after extraction, the waveforms may be further processed to form borehole images, perform fracture analysis, etc.

The various features of the method 300 or variations thereof are further described in the following discussions. For convenience, examples in these discussions use a low frequency monopole source for data acquisition. However, methods similar to or identical to method 300 can be applied to data acquired using an acoustic tool having a source different from a low frequency monopole source.

Using conventional semblance processing techniques, direct waves can be identified and a desired processing band can be selected. FIG. 4A is a time series plot of waveforms for eight channels acquired from a broadband monopole firing in a test well. FIG. 4B is a response frequency plot of the waveforms of the eight channels of FIG. 4A. FIG. 4C is a time semblance from the broadband monopole firing from which the waveforms of FIG. 4A are acquired. FIG. 4D is a frequency semblance from the broadband monopole firing from which the waveforms of FIG. 4A are acquired. The sampling period in this example is 20 μs. The frequency semblance used a simple weighted multiple signal classification (MUSIC) algorithm that detects the dominant mode at a given frequency. Compressional (P) wave 426, shear (S) wave 427, and Stoneley (St) wave 428 are clearly identified in FIG. 4C and FIG. 4D. The P wave 426 and the S wave 427 have much less energy than the Stoneley wave 428 and higher frequency content. This suggests that a low frequency monopole firing can substantially reduce the P wave energy and the S wave energy in the wave-train.

FIGS. 5A-5D show the same type of data for a low frequency (300 Hz-4 KHz) monopole firing at the same depth as shown in FIGS. 4A-4D. The sampling period for FIGS. 5A-5D is 40 μs. The figure shows that the P and S wave signatures are substantially reduced and there are potential reflection events appearing in the later portion of the direct Stoneley wave. The reflection events have greater energy than the P or S wave. The Stoneley wave energy is negligible beyond 5-6 KHz. In this example, the Stoneley wave can be identified as the direct wave and a process can be applied to detect up and down going reflection events. The P and S waves can be interpreted as coherent low-level noise. Based on the frequency response, the selected frequency band is several hundred Hz up to about 5 KHz.

The waveforms can be Fourier transformed into the frequency domain and the desired frequency band can be selected for further processing. A choice of frequency band and direct wave is not limited to the choice of frequency band and direct wave of this example. In addition, more than one direct wave is possible. For example, the broadband signal can be high pass filtered and a high frequency band selected for further processing. Then, P and potentially S and residual Stoneley direct waves can be present and need to be cancelled to detect reflections.

Figure 6:
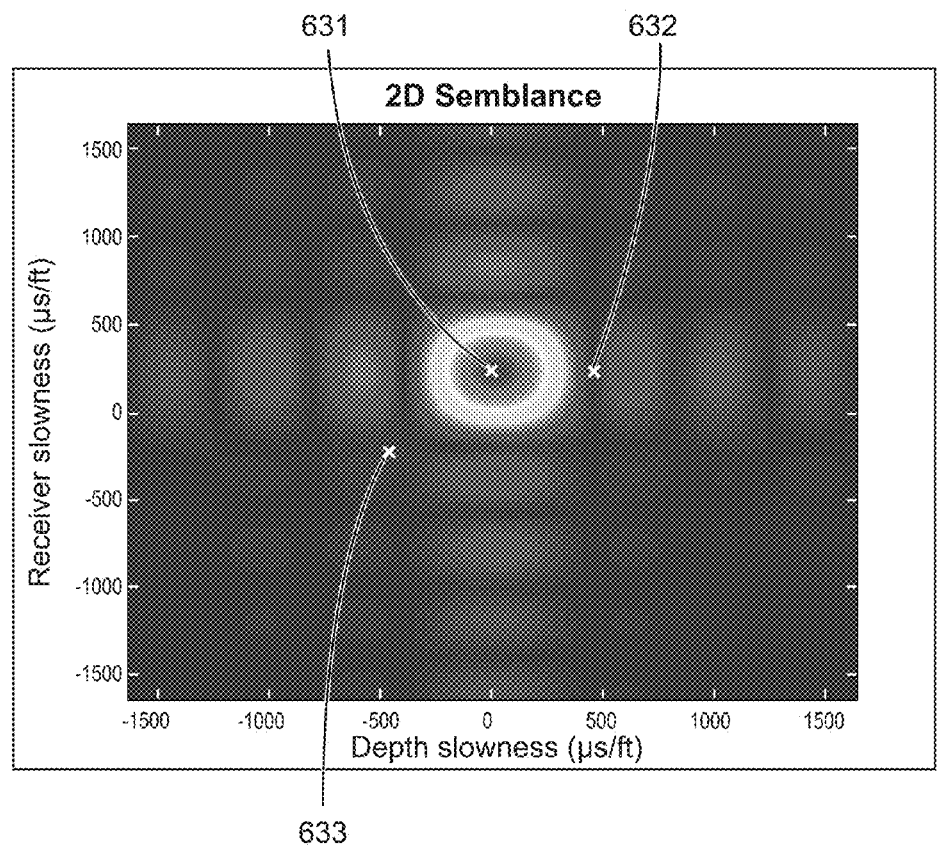
FIG. 6 is a representation of two-dimensional receiver-depth frequency semblance of the waveforms in the example of FIGS. 5A-5D, according to various embodiments.

Once the direct wave or direct waves have been defined, their 2D slowness can be detected using conventional frequency semblance techniques. FIG. 6 is a representation of 2D receiver-depth frequency semblance of the waveforms in the previous example. This 2D frequency semblance is calculated from the following equation, $$Semb(s_R, s_D, \omega, \bar{d}_k) = \qquad (1)$$

$$\frac{\left|\sum_{n=0}^{N_R-1} \sum_{m=0}^{N_D-1} X(n, m+k, \omega)\exp[-j\omega(s_R nd + s_D d_{m+k})]\right|}{\sqrt{N_R N_D \sum_{n=1}^{N_R} \sum_{m=1}^{N_D} |X(n, m+k, \omega)\tilde{X}(x, m+k, \omega)|^2}}.$$

In equation (1), X(n,k) is the Fourier transformed waveform for receiver n at depth k, and $(S_R, S_D)$ is the 2D test slowness. The term d is the receiver spacing, and $d_k$ is the k'th tool depth. The tilde represents complex conjugation, $N_R$ and $N_d$ are the number of receivers and depths in the 2D array, respectively, and ω is the angular frequency. The reference depth for this semblance is $$\bar{d}_k = \frac{1}{N_D} \sum_{m=0}^{N_D-1} d_{k+m}. \qquad (2)$$

Equation (1) illustrates the fact that the depth increments do not require equal spacing. Equal receiver spacing is not a requirement either, but this was not expressed in the equation because most commercial acoustic tools use equally spaced receivers. Neither equal receiver nor equal depth spacing are requirements in the embodiments discussed herein. The crosses 631, 632, 633 in FIG. 6 are rough estimates of where the positions of the direct, forward, and backward reflected Stoneley waves should occur for reflections from planes orthogonal to the borehole. It is a characteristic of direct waves that their depth slowness is much smaller than the slowness in the receiver dimension. The direct wave is so strong that the P, S, and reflected waves are not visible. The 2D slowness of the direct wave can be estimated from the position of the semblance peak. The denominator is a traditional scaling factor that need not be calculated since it is only a function of frequency. An alternative embodiment includes computing two 1D semblances for the receivers and depth independently.

$$Semb_R(s_R, \omega, \bar{d}_k) = \qquad (3)$$

$$\frac{\sum_{m=0}^{N_D-1} \left|\sum_{n=0}^{N_R-1} X(n, m+k+, \omega)\exp[-j\omega s_R nd]\right|}{\sqrt{N_R N_D \sum_{n=1}^{N_R} \sum_{m=1}^{N_D} |X(n, m+k, \omega)\tilde{X}(n, m+k, \omega)|^2}},$$

and $$Semb_D(s_D, \omega, \bar{d}_k) = \qquad (4)$$

$$\frac{\sum_{n=0}^{N_R-1} \left|\sum_{m=0}^{N_D-1} X(n, m+k, \omega)\exp[-j\omega s_D d_{m+k}]\right|}{\sqrt{N_R N_D \sum_{n=1}^{N_R} \sum_{m=1}^{N_D} |X(n, m+k, \omega)\tilde{X}(n, m+k, \omega)|^2}}.$$

The entire 2D slowness grid need not be computed to find the semblance peak since the direct wave receiver slowness is reasonably well known from receiver time semblance slowness log tracks and the depth slowness is known to be small. Other methods for detecting the 2D slowness of one or more direct waves can be devised by those skilled in the art. The example process is not limited to one method of detecting the 2D slowness. In an embodiment, if multiple direct waves are present, the process may be conducted to only find the 2D slowness of the primary direct wave. Weaker direct waves are detected and canceled successively after the primary direct wave has been canceled since they will become more visible.

In various embodiments, direct wave jammer cancelation is used. A 2D beam-former can be generated for jammer cancelation. In various instances, an optimal 2D beam-former for jammer cancelation can be generated. Once the 2D slowness of the direct wave or direct waves is determined as a function of frequency, optimal 2D beam-former weights for detecting reflections in the presence of a direct wave jammer or jammers can be computed by $$W = \kappa R^{-1} s, \qquad (5)$$

where s is the test steering vector, κ is a normalization factor, and R is the covariance matrix of the jammers and white noise. The test 2D steering vector at depth k is given by $$s_k = \begin{bmatrix} s_{RD,k} \\ s_{RD,k+1} \\ \vdots \\ s_{RD,k+N_D-1} \end{bmatrix}, \qquad (6)$$

where $$s_{RD,k} = \begin{bmatrix} \exp[j\omega(s_D d_k)] \\ \exp[j\omega(s_R d + s_D d_k)] \\ \vdots \\ \exp[j\omega(s_R(N_R-1)d + s_D d_k)] \end{bmatrix}. \qquad (7)$$

The covariance matrix is given by $$R_k = \sum_{J=1}^{N_J} \sigma_J^2 s_{J,k} s_{J,k}^H + \sigma^2 I, \qquad (8)$$

where $N_J$ is the number of jammers (direct waves) indexed by J. The term $s_{J,k}$ is the steering vector of the J'th direct wave. The expression $(\sigma/\sigma_J)^2$ is the ratio of background noise energy to jammer energy. A rough estimate is sufficient and can be estimated from the waveforms. H is the Hermitian conjugate (conjugate transpose). The normalization factor is $$\kappa = \frac{1}{\sqrt{[R_S^{-1}]^H R_S^{-1}}}. \qquad (9)$$

As stated earlier, when multiple jammers are present, the primary direct wave may be canceled first and the lower energy direct wave slowness can be detected by searching the beam-space where the weaker direct waves are expected to occur based on slowness log tracks and the fact that direct waves have small depth slowness. The entire covariance matrix may be constructed in this manner.

The reflections can be detected using a beam-former by computing the magnitude of the inner product of the beam-former weights and the waveforms for different test beam-space steering vectors $(S_R, s_D)$, $$BS_k(s_R, s_D, \omega) = |W_k^H X_k| = \frac{[R_k^{-1}s_k]^H X_k}{\sqrt{[R_k^{-1}s_k]^H R_k^{-1}s_k}}, \quad (10)$$

where $X_k$ is the data vector, $$X_k = \begin{bmatrix} X(0, k, \omega) \\ \vdots \\ X((N_R - 1, k, \omega) \\ \vdots \\ X(0, k + N_D - 1, \omega) \\ \vdots \\ X(N_R - 1, k + N_D - 1, \omega) \end{bmatrix}. \quad (11)$$

FIGS. 7A-7B are representations of images of 2D beam-space using jammer cancellation providing an example of direct Stoneley wave cancellation using the same data as FIG. 6. The image of FIG. 7B uses weight normalization. The image of FIG. 7A is without normalization. Both FIG. 7A and FIG. 7B show a strong back reflection event in the same position in the beam-space. Back reflections appear with negative depth slowness in this example because the receivers are below the transmitter. The normalization increases the intensity in the main lobe of the jammer because it is impossible to cancel and detect at the same steering vector resulting in degraded performance in the jammer main lobe. In an embodiment, the normalization can be dropped to improve processing time.

Reflection detection may be improved by stacking the beam-space over frequency. In an embodiment, to minimize the effect of dispersion on the stacking, the 2D slowness can be shifted and normalized before stacking using $$\bar{s}_R(\omega) = \frac{(s_R(\omega) - s_{RJ}(\omega))}{s_{RJ}(\omega)}, \quad (12)$$

and $$\bar{s}_D(\omega) = \frac{(s_D(\omega) - s_{DJ}(\omega))}{s_{RJ}(\omega)}, \quad (13)$$

where $(s_{RJ}(\omega), s_{DJ}(\omega))$ is the 2D slowness of the primary jammer (direct Stoneley wave in the current example). It is well known that the slowness of a Stoneley wave reflected from a plane orthogonal to the borehole has 2D slowness substantially given by (receivers are below the transmitter)

$$(s_R(\omega), s_D) = \begin{cases} (-s_{RJ}(\omega), -2s_{RJ}(\omega)) & \text{back reflection} \\ (s_{RJ}(\omega), 2s_{RJ}(\omega)) & \text{forward reflection} \end{cases}. \quad (14)$$

In this case, the normalization defined by equations (12) and (13) can reduce the effect of dispersion. Even with dipping structures one can expect an approximate proportionality to the receiver slowness of the direct Stoneley wave to hold true. The 2D slowness of the reflections can be computed from the detected normalized 2D slowness, $(\hat{s}_R(\omega), \hat{s}_D(\omega))$ by converting back to the original slowness.

$$s_R(\omega) = \hat{s}_R(\omega)s_{RJ}(\omega) + s_{RJ}(\omega), \quad (15)$$

and $$s_D(\omega) = \hat{s}_D(\omega)s_{RJ}(\omega) + s_{DJ}(\omega), \quad (16)$$

FIGS. 8A-8B are representations of images of 2D beam-space using jammer cancelation and stacking. The effect of frequency stacking on the beam-space is shown using the same data. The axes have been converted back into the slowness domain at the first frequency. The image of FIG. 8A used a time based re-log to estimate actual depths to form the steering vectors. The image of FIG. 8B used 0.5 ft. quantized equal depth increments. Both images show the jammer main lobe 831 and strong back reflection 832, but the frequency stacking has enhanced weaker reflections as well. A weaker reflection from the bottom of the tool (tool reflection 833) and a still weaker forward reflection 834 are visible. The image of FIG. 8B is not focused as well and the forward reflection is almost invisible. The forward reflection is clearly visible in the better focused image of FIG. 8A. This comparison shows that using measured unequal depth spacing can improve image quality. There are side-lobe and aliased energy at large slowness values. This can be removed by limiting the beam-space image to physically reasonable slowness values ($\pm 1000$ µs/ft in the left image). In this example, the Stoneley mode has very little dispersion and the reflections are well focused.

In an embodiment, the poorly focused reflections can be used to define a region of investigation in the normalized 2D beam-space. Then, with a parameterized 2D dispersion curve as a function of frequency defined, the beam-space value on the dispersion curve can be extracted at each frequency, and an objective function can be computed from the values. The dispersion curve parameters can be determined by optimizing the objective function to improve the focus. The above discussion demonstrates that direct wave jammer cancelation in conjunction with frequency stacking is an effective means of identifying reflections. Processing can include other frequency stacking methods as may be devised by those skilled in the art, and is not limited to the examples discussed herein.

The discussions above have included identification of reflections visually from the beam-space image. A tool, using stored data, calculated data, and data comparisons, can be used for identifying the reflections, providing a useful, practical application. FIGS. 8A-8B show a backward tool reflection from the bottom of the tool. Its 2D slowness can be well estimated by, $$(s_{RT}(\omega), s_{DT}(\omega)) = (-s_{RJ}(\omega), s_{DJ}(\omega)). \quad (17)$$

In an embodiment, the depth slowness of the other reflections can be estimated by computing a 1D beam-space along the depth dimension from $$BS_k(s_D, \omega) = \sqrt{W_k^H X_k [W_k^H X_k]^H}, \quad (18)$$

where $$X_k = \begin{bmatrix} X(0, k, \omega) & \cdots & X(N_R - 1, k, \omega) \\ \vdots & & \vdots \\ X(0, k + N_D - 1, \omega) & \cdots & X(N_R - 1, k + N_D - 1, \omega) \end{bmatrix}, \quad (19)$$

and the test and jammer steering vectors have the form $$s_{k(J)} = \begin{bmatrix} \exp(j\omega s_{D(J)} d_k) \\ \exp(j\omega s_{D(J)} d_{k+1}) \\ \vdots \\ \exp(j\omega s_{D(J)} d_{k+N_D-1}) \end{bmatrix}. \quad (20)$$

FIGS. 9A-9B are representations of images of 1D depth and receiver beam-spaces using jammer cancelation and stacking. The image of FIG. 9B shows the 1D depth beam-space for many depths with the previously described frequency stacking. The forward and backward reflections and jammer main lobe are clearly visible. The nulled main lobe has a width approximately given by $1/N_D$ of the spatial sampling frequency. This region can be ignored and the depth slowness of the dominant backward and forward reflections, $(s_{DB}(\omega), s_{DF}(\omega))$, can be estimated from the positions of the two reflection peaks. Then, equations (5-11) can be used to calculate the beam-space along $BS_k(s_R, s_{DB}, \omega)$ and $BS_k(s_R, s_{DF}, \omega)$ with frequency stacking. The image of FIG. 9A shows the beam-space $BS_k(s_R, s_{DB}, \omega)$ stacked over frequency for many depths. The main lobe can be ignored and the backward reflection slowness, $s_{RB}(\omega)$ can be found from the position of the negative slowness peak, where $s_{RF}(\omega)$ can be estimated in a similar fashion.

In an alternative embodiment, a portion of the 2D beam-space, where reflections are likely to occur, may be identified from formation slowness properties, likely formation geometry, and synthetic modeling. A course grid search in this region with a grid spacing of a fraction of the main-lobe width can be used to identify peaks. Then, a fine grid search can be performed in the region of the peaks to determine 2D slowness values. Other beam-space search methods for detecting the 2D slowness of one or more direct waves or reflections may be used by those skilled in the art. The example process is not limited to one method of beam-space searching.

Once the 2D slowness of the direct and reflected waves is determined as a function of frequency, a 2D wave separation algorithm can be used to extract the reflection events. A least square inversion (minimization of an L2 norm objective function) can be used to extract the frequency response of the reflection events. For example, use of a least square inversion in a 1D inversion is discussed in U.S. Pat. No. 7,492,664 to Tang et al. At depth $\bar{d}_k$ the frequency response of the direct waves and reflections at mid-receiver array, $h_k$, is given by $$h_k(\omega) = [Z_k^H Z_k]^{-1} Z_k^H X_k(\omega). \quad (21)$$

In equation (21), the waveform data vector, $X_k$, is defined by equation (11). $h_k$ is given by $$h_k(\omega) = \begin{bmatrix} h_{k1}(\omega) \\ \vdots \\ h_{kP}(\omega) \end{bmatrix}, \quad (22)$$

where the indices 1, ..., P denote the direct and reflected waves in order of decreasing power. The order can be determined from the beam-space values at the reflection peaks. For example, in the example from FIGS. 8A-8B, (1, 2, 3, 4)=(direct Stoneley, backward reflection, tool reflection, forward reflection). $Z_k$ is a matrix given by $$Z_k[Z_{k1} \ldots Z_{kP}]. \quad (23)$$

The $Z_{kp}$ are column propagation vectors for each wave, p, $$Z_{kp} = \begin{bmatrix} z_{kp} \\ z_{k+1,p} \\ \vdots \\ z_{k+N_D-1,p} \end{bmatrix}, \quad (24)$$

Where $$z_{kp} = \begin{bmatrix} \exp[j\omega(s_{Rp}(0-\bar{n})d + s_{Dp}(d_k - \bar{d}_k))] \\ \exp[j\omega(s_{Rp}(1-\bar{n})d + s_{Dp}(d_k - \bar{d}_k))] \\ \vdots \\ \exp[j\omega(s_{Rp}(N_R-1-\bar{n})d + s_{Dp}(d_k - \bar{d}_k))] \end{bmatrix}, \quad (25)$$

and $\bar{n}$ is the mid-array receiver index, given by $$\bar{n} = \frac{1}{N_R} \sum_{n=0}^{N_R-1} n. \quad (26)$$

At specific frequencies, it is possible for some of the column vectors, $Z_{kp}$, to become nearly co-linear, making the inversion at those frequencies unstable and generating errors in the waveforms. These errors are usually minimal, but occasionally a very large spurious result occurs at a particular frequency, creating substantial error in the waveforms of the weaker reflections. Herein, these frequencies are referred to as aliased. This problem can be mitigated by tracking the invertibility of the matrix $Z^H Z$ as a function of frequency.

In an embodiment, reducing aliasing errors can begin with defining the following (the depth index is dropped for convenience):

$$dp(p, p', \omega) = \left| \frac{|Z_p^H(\omega) Z_{p'}(\omega)|}{\sqrt{Z_p^H(\omega) Z_p(\omega) Z_{p'}^H(\omega) Z_{p'}(\omega)}} - 1 \right|, p' < p. \quad (27)$$

When $dp(p, p'; \omega)$ is small the corresponding column vectors are nearly co-linear. Recall the waves are ordered by energy, so when $$\prod_{p'=1}^{p-1} dp(p, p', \omega) < \text{tolerance}, \quad (28)$$

the column vector with index equal to p can be dropped and its corresponding frequency response at $\omega$ can be set to zero. The product in equation (28) is only over kept indices. The indices are checked in ascending order (decreasing energy). The reduced Z matrix can be used to invert for the frequency response of the waveforms corresponding to the kept indices. This stabilizes the inversion so that large spurious results do not occur.

In an embodiment, the fact that the waveforms are zero-filled before applying the Fourier transform can be used. Then, the individual separated waves should be zero in the zero-filled portion of the timeline. This will not be true if noticeable aliasing errors have occurred. By minimizing the sum of the energies of the individual waves in the zero-filled portion of the timeline, it is possible to derive a matrix equation in the frequency domain that resolves the aliasing. The equation is exact and invertible under the following conditions: (1) the full bandwidth of the waveforms is used, (2) the timeline is long enough to record the entire wave-train, (3) there is no noise, and (4) the slowness of the waveforms as a function of frequency is known exactly.

Under normal operating conditions none of these conditions is satisfied, and the "exact" method generally gives the same performance as the technique defining dp(p, p', ω), while requiring considerably more processing time. Therefore, the technique defining dp(p, p', ω) may be preferred, and the technique using the fact that the waveforms are zero-filled before applying the Fourier transform are not described herein in detail. If desired, the extracted waves may be individually stacked over several depths using their estimated frequency dependent depth slowness to further reduce noise.

Figures 10A, 10B:
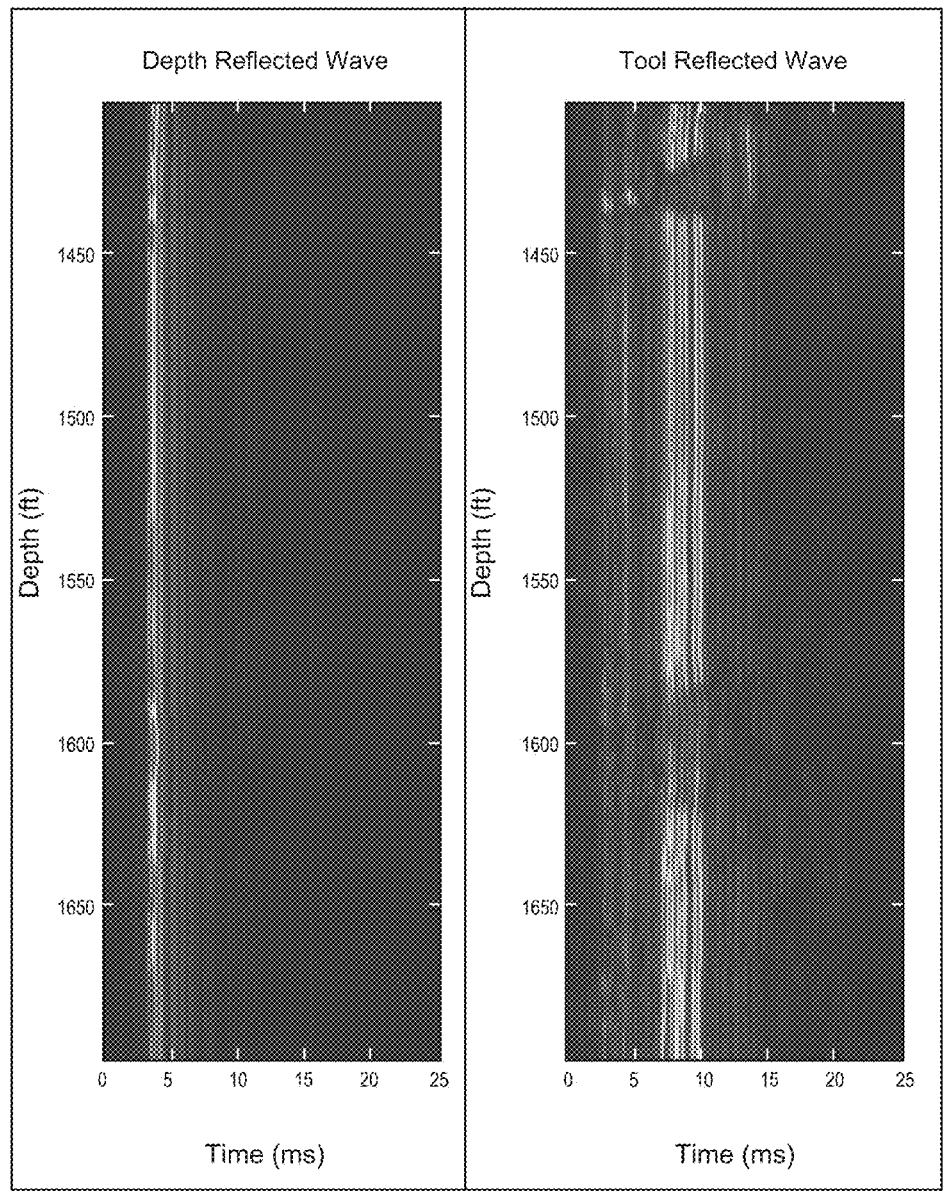
FIGS. 10A-10D are representations of images of the separated waveforms versus depth over 300 ft using data as in FIGS. 5A-5D, according to various embodiments.
Figures 10C, 10D:
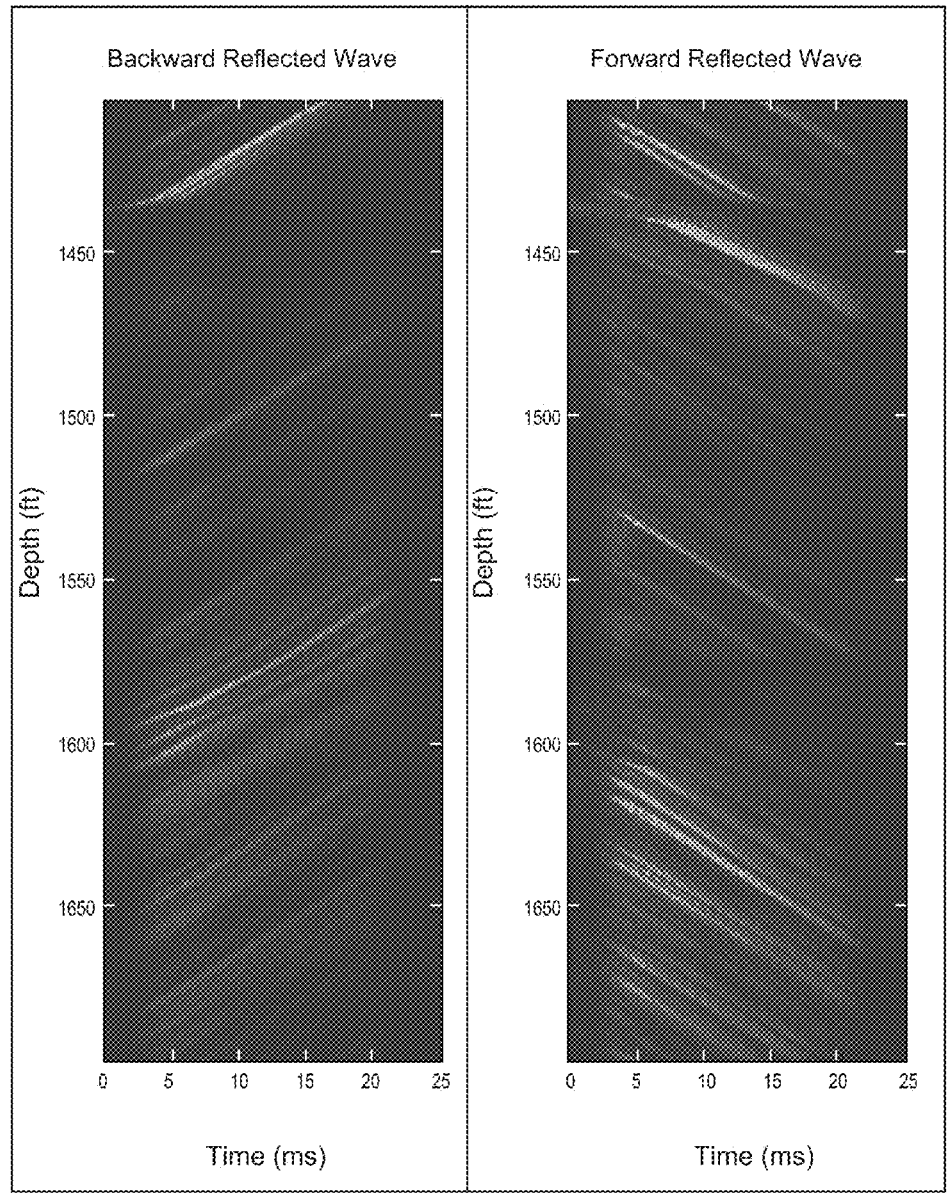

FIGS. 10A-10D are representations of images of the separated waveforms versus depth over 300 ft using data as in FIGS. 5A-5D. The wave in FIG. 10A is the direct wave, the wave in FIG. 10B is the tool reflection, the wave in FIG. 10C is the backward reflection, and the wave in FIG. 10D is the forward reflection. The direct wave and the tool reflection have very stable arrival times. The tool reflection is widely distributed in time and extends out to 10 ms. It strongly overlaps the backward and forward reflections. If not properly separated, it would degrade the quality of images formed from the backward and forward reflections.

Figures 11A, 11B, 11C:
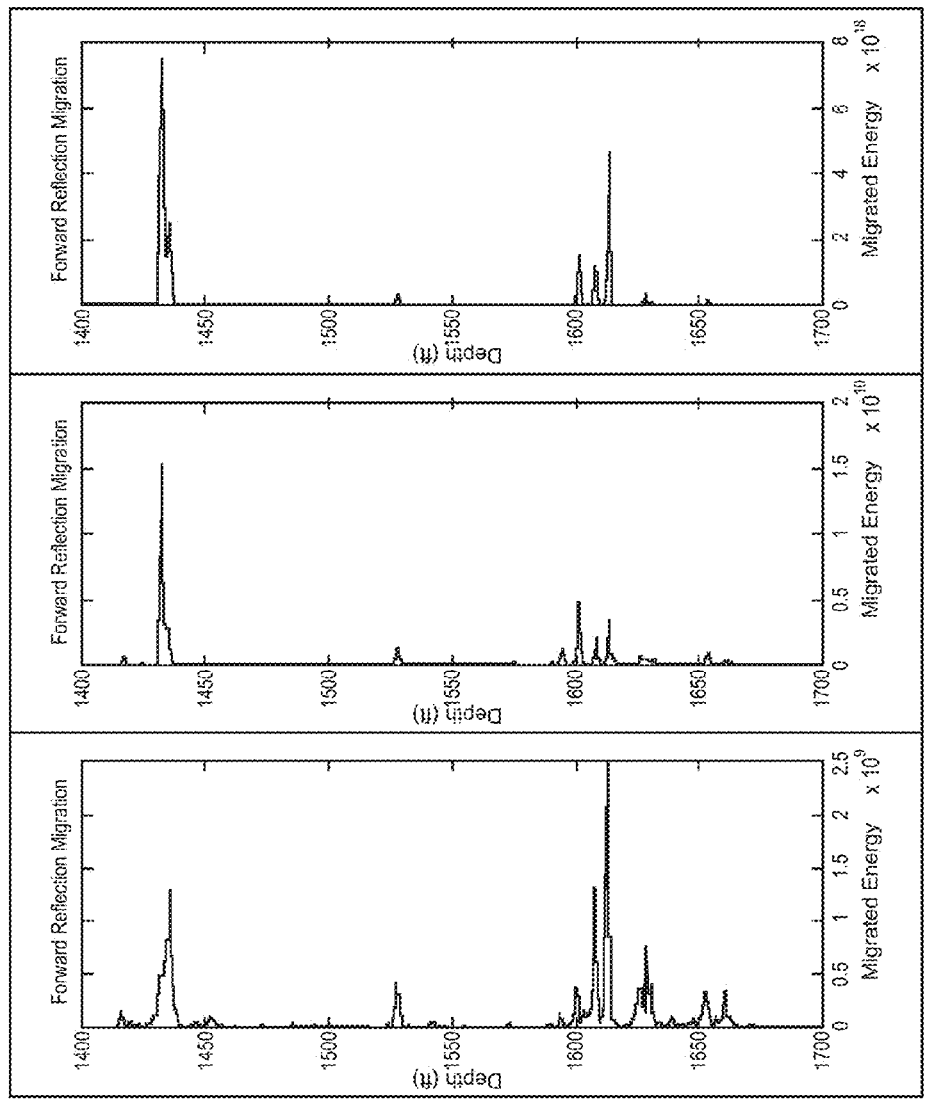
FIGS. 11A-11C are representations of simple time-slowness stacked images of the forward and backward reflections versus depth, in accordance with various embodiments.

FIGS. 11A-11C are representations of simple time-slowness stacked images of the forward and backward reflections versus depth. The images show the position in depth of the origin of the reflection events. The reflection events could be bedding plane boundaries or fractures. The images help to understand the geological structure of the formation vs. depth and characterize the reservoir. For example, the location of a reflection event could be identified, and then analyzed to determine if it is caused by a thin gas bed.

Figures 12A, 12B, 12C, 12D, 12E:
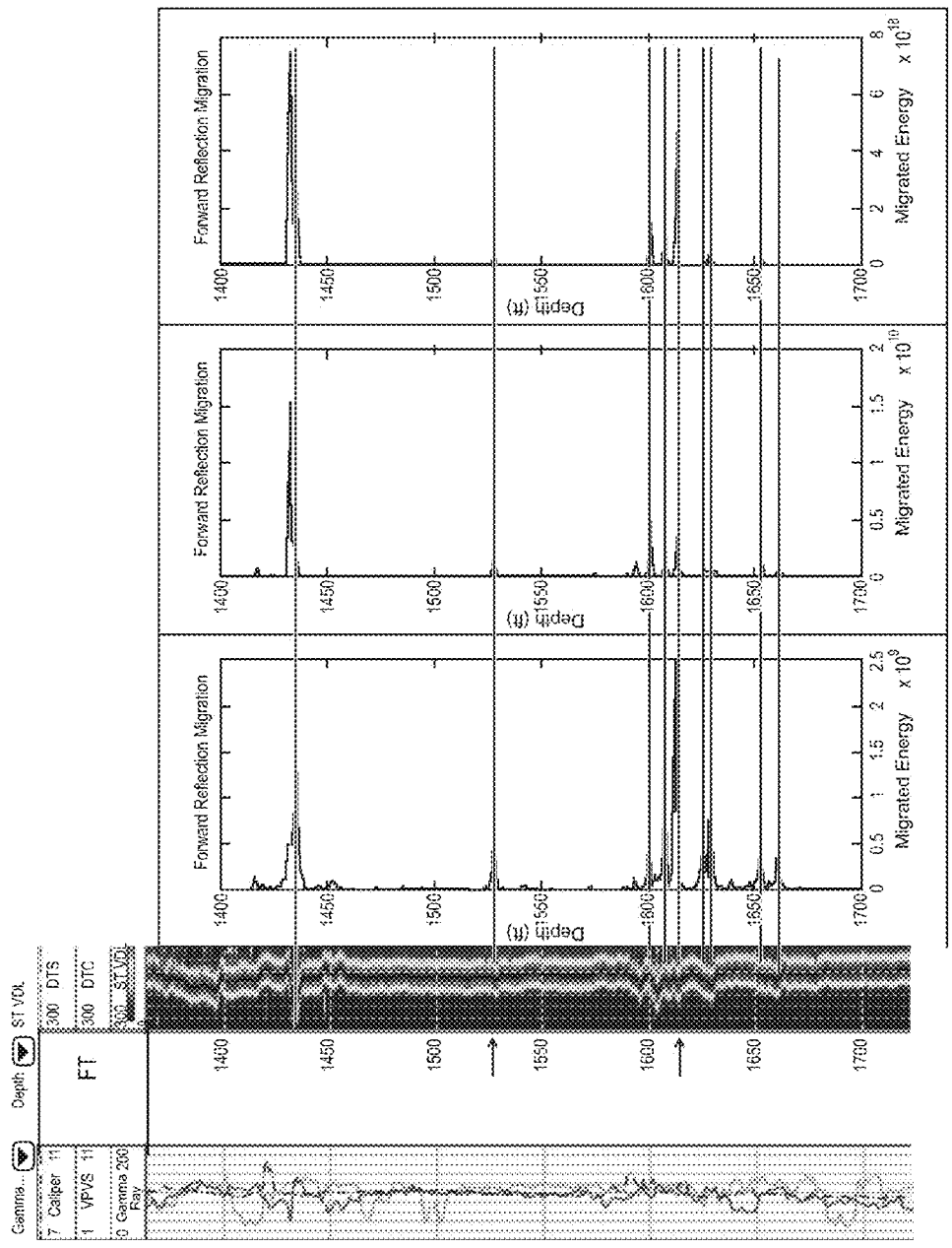
FIG. 12A-12E are representations of images alongside a gamma log and a visual density log of the time semblance for a low frequency monopole source, in accordance with various embodiments.

FIGS. 12A-12E are representations of images alongside a gamma log and a visual density log (VDL) of the time semblance from a low frequency monopole source. FIG. 12A is the gamma log and FIG. 12B is the VDL of the time semblance from the low frequency monopole source. FIGS. 12C-12E are the representations of images alongside the VDL of FIG. 12B. The forward and backward images are well correlated with rapid changes in the VDL enabling one to locate the positions of possible fractures and bed boundaries for further analysis.

FIGS. 13A-13D are representations of forward and backward images alongside a gamma log and a VDL of the time semblance from a broadband monopole source. The slowness is from a broadband monopole source. FIG. 13A is the gamma log and FIG. 13B is the VDL of the slowness from the broadband monopole source. FIGS. 13C-13D are representations of the forward image and the backward image near the largest reflection. The backward image is above the reflection event and the forward image is below the reflection event. The reflection event is probably a thin bed.

In various embodiments, processing of acoustic data can be performed to remove the direct wave using a 2D beamformer. Such processing may include using an optimal 2D beam-former. The removal of the direct wave or direct waves can make wave reflections visible in the beam-space so that their slowness can be estimated. The slowness of the reflections can be used in the wave separation. This technique can make the wave separation more accurate. It can provide a process that does not rely on an assumption, which may not be accurate, that desired reflections are averaged out during a wave-separation with respect to estimating individual direct waves (e.g. Stoneley wave and/or compressional wave) using 1D wave-separation, as performed by conventional processing in which the reflected waves are extracted by subtracting the estimated direct waves from the original waveform.

Processes similar to or identical to processes as taught herein can provide separation of secondary reflections from dominant primary waves. Such processing can use a jammer cancelation and frequency stacking technique for detecting the 2D slowness of the reflections as a function of frequency before wave separation. This technique allows the wave separation to treat the reflected waves as signal instead of noise. The wave separation can be performed in two dimensions (receiver and depth) to improve signal-to-noise ratio (SNR). The wave separation can also be stabilized against aliasing error. The processing can also allow for variable depth spacing.

The separation of secondary reflections from dominant primary waves can provide an important component of near borehole imaging techniques. Such techniques can be applied to borehole imaging, which is useful for fracture detection and analysis. Fractures are significant conduits for hydrocarbon flow into a borehole or loss of borehole fluids into the formation. Knowledge of their position and conductivity improves efficiency in managing oil well production. Borehole imaging is also used to geo-steer while drilling by identifying bedding planes. This allows adjustments in the drilling direction to avoid dog-legs and stay within a pay-zone.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structures of such instructions may be operated on by one or more processors. Executing these physical structures can cause the machine to perform operations comprising collecting waveforms from an array of acoustic receivers in a borehole, the waveforms categorized by a receiver index and a depth index for the array, the array having a number of receivers at a number of depths; processing the waveforms to compute a beamformer to detect a reflection wave in the presence of a direct wave identified from the collected waveforms, the beamformer correlated to receiver and depth for the array defining a beam-space; applying the beam-former to detect the reflection wave; separating the direct wave and the reflection wave to extract the reflection wave, after applying the beam-former to detect the reflection waves, the separating correlated to receiver and depth for the array; and using the extracted reflected wave to image, analyze, or image and analyze entities associated with the borehole.

Collecting the waveforms and processing the waveforms can include: transforming the collected waveforms from the time domain to the frequency domain; selecting a frequency band; detecting slowness of the direct wave as a function of frequency with respect to receiver slowness and depth slowness; and computing weights of the beam-former using the slowness of the direct wave. Applying the beam-former can include computing an inner product of the weights and a vector of the waveforms correlated to receiver slowness and depth slowness. Applying the beam-former to detect the reflection wave can include stacking the beam-space over frequency. Separating the direct wave and the reflection wave can include applying a least squares inversion process. Separating the direct wave and the reflection wave can include, for a reference depth, generating a frequency response using slowness of the direct and reflected waves such that the frequency response is a frequency response vector having direct wave and reflected wave components ordered according to power. Generating the frequency response can include ordering the reflected wave components based on values of the beam-space at reflection peaks. The instructions to perform operations can include operations including adjusting the frequency response vector by reducing a matrix that generates the frequency response vector, if column vectors of the matrix are nearly co-linear at a specific frequency. The instructions to perform operations can include operations including using a monopole acoustic source or a dipole acoustic source to provide the collected waveforms. The instructions can include instructions to operate a tool or tools having sensors disposed downhole in a borehole to provide data to a processing unit in accordance with the teachings herein.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise an acoustic tool having a transmitter and an array of acoustic receivers, the array having a number of receivers at a number of depths; a control unit operable to manage generation of acoustic signals from the transmitter and to manage collection of received signals at the receivers; and a processing unit. The acoustic tool, the control unit, and the processing unit can be arranged to: collect waveforms from the array of acoustic receivers in a borehole, the waveforms categorized by a receiver index and a depth index for the array; process the waveforms to compute a beam-former to detect a reflection wave in the presence of a direct wave identified from the collected waveforms, the beam-former correlated to receiver and depth for the array defining a beam-space; apply the beam-former to detect the reflection wave; separate the direct wave and the reflection wave to extract the reflection wave, after applying the beam-former to detect the reflection waves, the separating correlated to receiver and depth for the array; and use the extracted reflected wave to image, analyze, or image and analyze entities associated with the borehole.

The transmitter can include one or more of a monopole acoustic transmitter or a dipole acoustic transmitter. The transmitter can be realized by other acoustic transmitters. The array of receivers can include a plurality of receivers at each of a plurality of planes along a length of the tool. The processing unit can be structured to perform processing techniques similar to or identical to the techniques discussed herein.

The processing unit can be configured to acquire signals from the downhole sensors, process the acquired signals, and process data related to or generated from the acquired signals. To collect the waveforms and process the waveforms, the processing unit can be arranged to: transform the collected waveforms from the time domain to the frequency domain; select a frequency band; detect slowness of the direct wave as a function of frequency with respect to receiver slowness and depth slowness; and compute weights of the beam-former using the slowness of the direct wave. Application of the beam-former by the processing unit can include computation of an inner product of the weights and a vector of the waveforms correlated to receiver slowness and depth slowness. Application of the beam-former by the processor to detect the reflection wave can include stacking of the beam-space over frequency. Separation of the direct wave and the reflection wave by the processing unit can include application of a least squares inversion process. Separation of the direct wave and the reflection wave by the processing unit can include, for a reference depth, generation of a frequency response by use of slowness of the direct and reflected waves such that the frequency response is a frequency response vector having direct wave and reflected wave components ordered according to power. Generation of the frequency response by the processing unit can include an ordering of the reflected wave components based on values of the beam-space at reflection peaks. The processing unit can be arranged to adjust the frequency response vector by reduction of a matrix that generates the frequency response vector, if column vectors of the matrix are nearly co-linear at a specific frequency.

The processing unit may be arranged as an integrated unit or a distributed unit. The processing unit can be disposed at the surface of a wellbore to process the data from the downhole sensors. The processing unit be disposed in a housing unit integrated with the tool structure or arranged downhole in the vicinity of the tool structure. The processing unit may process in real time data from the downhole sensors in a manner similar to or identical to the techniques discussed herein.

Figure 14:
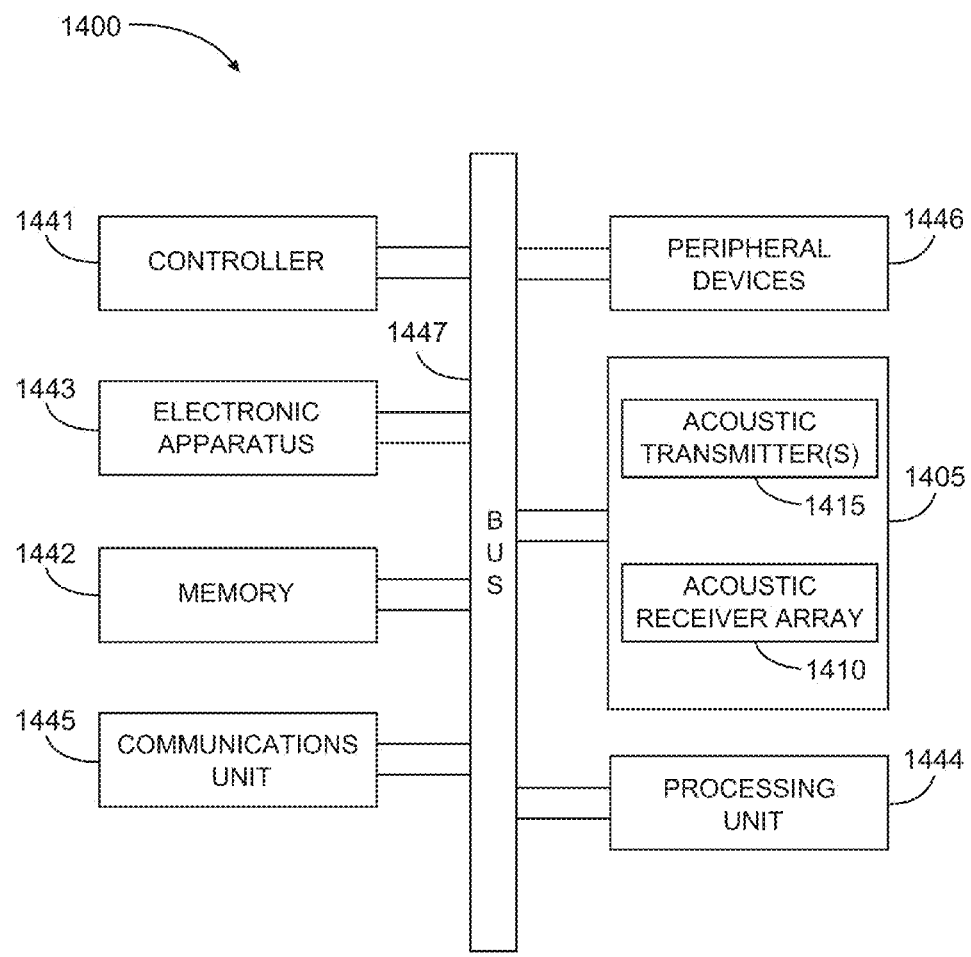
FIG. 14 is a block diagram of features of an example system having an acoustic tool configured with one or more acoustic transmitters and an acoustic receiver array, where the acoustic tool is operable in a borehole and the system is operable to extract reflections from acoustic array data, in accordance with various embodiments.

FIG. 14 is a block diagram of features of an example embodiment of a system 1400 having an acoustic tool 1405 configured with one or more acoustic transmitters 1415 and an acoustic receiver array 1410, where the acoustic tool 1405 is operable in a borehole and the system 1400 is operable to extract reflections from acoustic array data. The tool 1405 having an arrangement of the acoustic transmitters 1415 and the acoustic receiver array 1410 can be realized in a similar or identical manner to arrangements of acoustic tools discussed herein. Components of the system 1400 are operable to collect received signals at the acoustic receiver array 1410 and to perform processing of the acoustic signals to extract reflections from acoustic array data. The system 1400 can be arranged to perform various operation on the data, acquired from the acoustic receiver array 1410, in a manner similar or identical to any of the processing techniques discussed herein.

The system 1400 can include a controller 1441, a memory 1442, an electronic apparatus 1443, and a communications unit 1445. The controller 1441, the memory 1442, and the communications unit 1445 can be arranged to operate as a processing unit to control activation of the tool 1405 and to perform one or more signal and data manipulations on the signals collected by the tool 1405 to analyze formation properties associated with operations in a borehole. In various embodiments, the controller 1441 can be realized as a processor or a group of processors that may operate independently depending on an assigned function. A processing unit, to engage in analysis of acoustic signals and to perform processing of the acoustic signals to extract reflections from acoustic array data, can be distributed among the components of system 1400 including the electronic apparatus 1443. Alternatively, the system 1400 can include a processing unit 1444 to control activation of the one or more the acoustic transmitters 1415 and collection of signals in receivers of the acoustic receiver array 1410 in the tool 1405 and to manage processing schemes in accordance with measurement procedures and signal processing as described herein. The processing unit 1444 and/or other components of the system 1400 can be configured to operate similar to or identical to any of the processing techniques taught herein.

The communications unit 1445 can include communications for operation downhole. Such downhole communications can include a telemetry system. Communications unit 1445 may use combinations of wired communication technologies and wireless technologies at frequencies that do not interfere with on-going measurements.

The system 1400 can also include a bus 1447, where the bus 1447 provides electrical conductivity among the components of the system 1400. The bus 1447 can include an address bus, a data bus, and a control bus, each independently configured. The bus 1447 can be realized using a number of different communication mediums that allows for the distribution of components of the system 1400. The bus 1447 can include instrumentality for network communication. The use of bus 1447 can be regulated by the controller 1441.

In various embodiments, peripheral devices 1446 can include displays, additional storage memory, or other control devices that may operate in conjunction with the controller 1441 or the memory 1442. The peripheral devices 1446 can be arranged with a display, as a distributed component on the surface of a well, that can be used with instructions stored in the memory 1442 to implement a user interface to manage the operation of the acoustic tool 1405 and/or components distributed within the system 1400 and to manage the operations to perform processing of the acoustic signals to extract reflections from acoustic array data. Such a user interface can be operated in conjunction with the communications unit 1445 and the bus 1447.

Figure 15:
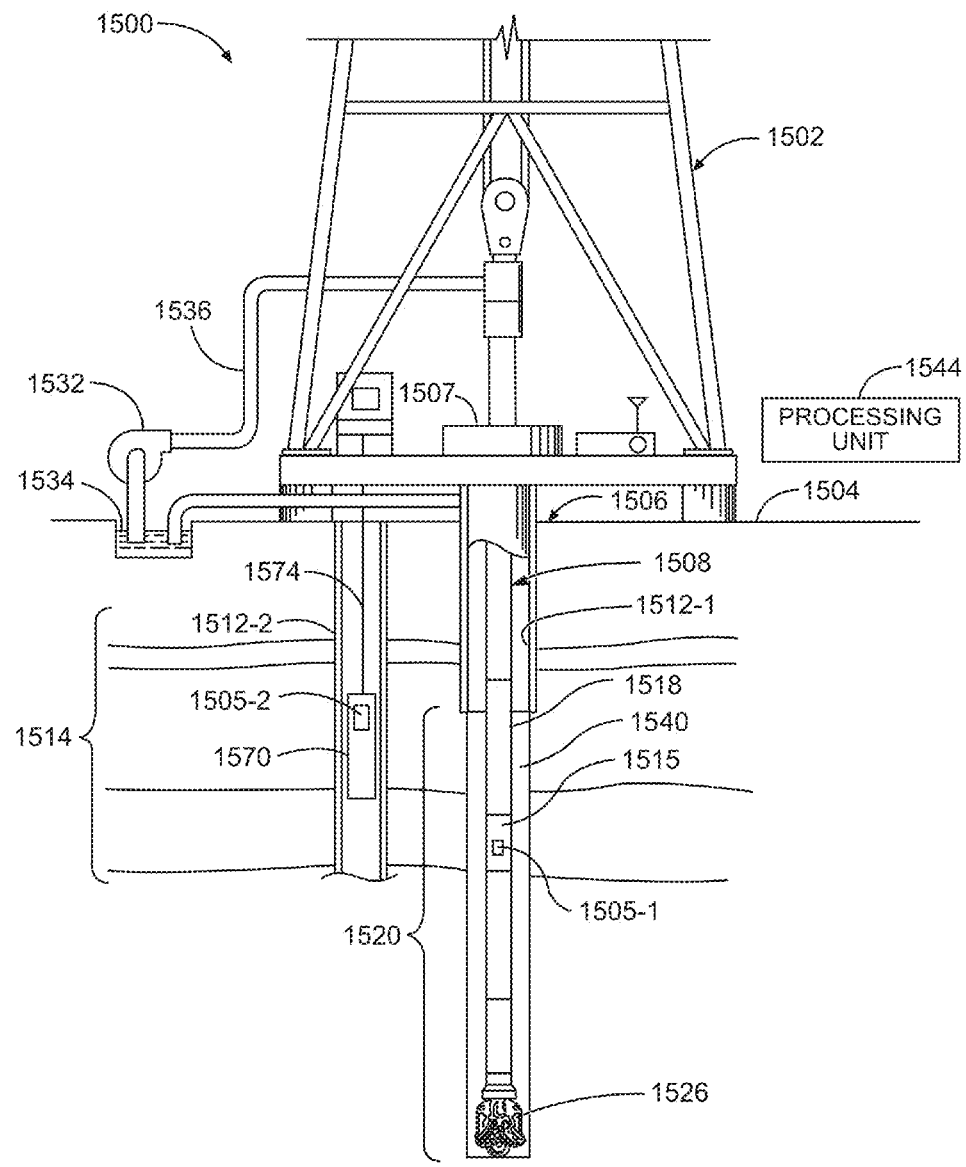
FIG. 15 is a block diagram of features of an example system at a drilling site having an acoustic tool configured with one or more acoustic transmitters and an acoustic receiver array, where the acoustic tool is operable in a borehole and the system is operable to extract reflections from acoustic array data, in accordance with various embodiments.

FIG. 15 is a schematic diagram of a system 1500 at a drilling site, where the system 1500 includes an acoustic measurement tool 1505-1, 1505-2, or both 1505-1 and 1505-2 configured with sensors, the sensors including one or more acoustic transmitters to generate an acoustic signal(s) and an acoustic array of receivers at which waves are received in response to the generation of the acoustic signal(s) such that the received waves can be processed to extract reflections from acoustic array data. Tools 1505-1 and 1505-2 can be realized in a similar or identical manner to arrangements taught herein.

A control unit and processing unit of the acoustic measurement tools 1505-1 and 1505-2 can be distributed among system 1500 or can be integrated with acoustic measurement tools 1505-1 and 1505-2 providing for control and analysis activities to be conducted downhole. The acoustic measurement tools 1505-1 and 1505-2 can be realized in a similar or identical manner to arrangements and processing discussed herein to make acoustic measurements in a borehole and to process the signals and data from the acoustic measurements to perform processing of the acoustic signals to extract reflections from acoustic array data from data generated from signals acquired at the acoustic measurement tools 1505-1 and 1505-2. A processing unit 1544 may be located at a surface 1504 of a well 1506 to extract reflections from acoustic array data as taught herein.

The system 1500 can include a drilling rig 1502 located at the surface 1504 of the well 1506 and a string of drill pipes, that is, the drill string 1508, connected together so as to form a drilling string that is lowered through a rotary table 1507 into a wellbore or borehole 1512-1. The drilling rig 1502 can provide support for the drill string 1508. The drill string 1508 can operate to penetrate the rotary table 1507 for drilling the borehole 1512-1 through subsurface formations 1514. The drill string 1508 can include drill pipe 1518 and a bottom hole assembly 1520 located at the lower portion of the drill pipe 1518.

The bottom hole assembly 1520 can include a drill collar 1515, the tool 1505 attached to the drill collar 1515, and a drill bit 1526. The drill bit 1526 can operate to create the borehole 1512-1 by penetrating the surface 1504 and the subsurface formations 1514. The acoustic measurement tool 1505-1 can be structured for an implementation in the borehole 1512-1 as a measurements-while-drilling (MWD) system, such as a logging-while-drilling (LWD) system. The housing containing the acoustic measurement tool 1505-1 can include electronics to activate one or more transmitters of the acoustic measurement tool 1505-1 and collect responses from one or more receivers of the acoustic measurement tool 1505-1. Such electronics can include a processing unit to extract reflections from acoustic array data and to provide formation analysis, borehole analysis, or combinations thereof to the surface over a standard communication mechanism for operating a well. Alternatively, electronics can include a communications interface to provide signals output by receivers of the acoustic measurement tool 1505-1 to the surface over a standard communication mechanism for operating a well, where these output signals can be analyzed at the processing unit 1544 at the surface to extract reflections from acoustic array data and to provide formation analysis, borehole analysis, or combinations thereof.

During drilling operations, the drill string 1508 can be rotated by the rotary table 1507. In addition to, or alternatively, the bottom hole assembly 1520 can also be rotated by a motor (e.g., a mud motor) that is located downhole. The drill collars 1515 can be used to add weight to the drill bit 1526. The drill collars 1515 also can stiffen the bottom hole assembly 1520 to allow the bottom hole assembly 1520 to transfer the added weight to the drill bit 1526, and in turn, assist the drill bit 1526 in penetrating the surface 1504 and subsurface formations 1514.

During drilling operations, a mud pump 1532 can pump drilling fluid (sometimes known by those of skill in the art as "drilling mud") from a mud pit 1534 through a hose 1536 into the drill pipe 1518 and down to the drill bit 1526. The drilling fluid can flow out from the drill bit 1526 and be returned to the surface 1504 through an annular area 1540 between the drill pipe 1518 and the sides of the borehole 1512-1. The drilling fluid may then be returned to the mud pit 1534, where such fluid is filtered. In some embodiments, the drilling fluid can be used to cool the drill bit 1526, as well as to provide lubrication for the drill bit 1526 during drilling operations. Additionally, the drilling fluid may be used to remove subsurface formation 1514 cuttings created by operating the drill bit 1526.

In various embodiments, the acoustic measurement tool 1505-2 may be included in a tool body 1570 coupled to a logging cable 1574 such as, for example, for wireline applications. The tool body 1570 containing the acoustic measurement tool 1505-2 can include electronics to activate one or more transmitters of the acoustic measurement tool 1505-2 and collect responses from one or more receivers of the acoustic measurement tool 1505-2. Such electronics can include a processing unit to extract reflections from acoustic array data and to provide formation analysis, borehole analysis, or combinations thereof to the surface over a standard communication mechanism for operating a well. Alternatively, electronics can include a communications interface to provide signals output by receivers of the acoustic measurement tool 1505-2 to the surface over a standard communication mechanism for operating a well, where these output signals can be analyzed at the processing unit 1544 at the surface to extract reflections from acoustic array data and to provide formation analysis, borehole analysis, or combinations thereof. The logging cable 1574 may be realized as a wireline (multiple power and communication lines), a mono-cable (a single conductor), and/or a slick-line (no conductors for power or communications), or other appropriate structure for use in the borehole 1512-2. Though, for convenience, FIG. 15 depicts both an arrangement for wireline applications and an arrangement for LWD applications, the system 1500 may be also realized for one of the two applications.

In various embodiments, a method can include extracting reflections from acoustic array data having combinations of features as described herein. Different features presented herein may be used in a number of embodiments. In various embodiments, a method 1 comprises: collecting waveforms from an array of acoustic receivers in a borehole, the waveforms categorized by a receiver index and a depth index for the array, the array having a number of receivers at a number of depths; processing the waveforms to compute a beam-former to detect a reflection wave in the presence of a direct wave identified from the collected waveforms, the beam-former correlated to receiver and depth for the array defining a beam-space; applying the beam-former to detect the reflection wave; separating the direct wave and the reflection wave to extract the reflection wave, after applying the beam-former to detect the reflection waves, the separating correlated to receiver and depth for the array; and using the extracted reflected wave to image, analyze, or image and analyze entities associated with the borehole.

A method 2 can include the features of method 1 and can include collecting the waveforms and processing the waveforms including: transforming the collected waveforms from the time domain to the frequency domain; selecting a frequency band; detecting slowness of the direct wave as a function of frequency with respect to receiver slowness and depth slowness; and computing weights of the beam-former using the slowness of the direct wave. A method 3 can include the features of method 1 or 2 and can include applying the beam-former including computing an inner product of the weights and a vector of the waveforms correlated to receiver slowness and depth slowness. A method 4 can include the features of any of methods 1-3 and can include applying the beam-former to detect the reflection wave including stacking the beam-space over frequency. A method 5 can include the features of any of methods 1-4 and can include separating the direct wave and the reflection wave includes applying a least squares inversion process. A method 6 can include the features of any of methods 1-5 and can include separating the direct wave and the reflection wave including, for a reference depth, generating a frequency response using slowness of the direct and reflected waves such that the frequency response is a frequency response vector having direct wave and reflected wave components ordered according to power. A method 7 can include the features of any of methods 1-6 and can include generating the frequency response includes ordering the reflected wave components based on values of the beam-space at reflection peaks. A method 8 can include the features of any of methods 1-7 and can include adjusting the frequency response vector by reducing a matrix that generates the frequency response vector, if column vectors of the matrix are nearly co-linear at a specific frequency. A method 9 can include the features of any of methods 1-8 and can include using a monopole acoustic source or a dipole acoustic source to provide the collected waveforms. Features of any of methods 1-9 or other combinations of features, as taught herein, may be combined into a procedure according to the teachings herein.

In various embodiments, a system can include an acoustic tool having a transmitter and an array of acoustic receivers, the array having a number of receivers at a number of depths; a control unit operable to manage generation of acoustic signals from the transmitter and to manage collection of received signals at the receivers; and a processing unit, having combinations of features as described herein. Different features presented herein may be used in a number of embodiments. In various embodiments, a system 1 comprises: an acoustic tool having a transmitter and an array of acoustic receivers, the array having a number of receivers at a number of depths; a control unit operable to manage generation of acoustic signals from the transmitter and to manage collection of received signals at the receivers; and a processing unit, wherein the processing unit, or combinations of the processing unit, acoustic tool, and control unit are arranged to perform operations according to any of methods 1-9. Features of any of the permutations of system 1 or other combinations of features, as taught herein, may be combined into a system according to the teachings herein.

In various embodiments, a non-transitory machine-readable storage device 1 has instructions stored thereon, which, when performed by a machine, cause the machine to perform operations, the operations comprising the features of any of methods 1-9 or using the features of any of the permutations of system 1 or other combinations of features as taught herein. Features of any of the permutations of a non-transitory machine-readable storage device 1 or other combinations of features, as taught herein, may be combined into non-transitory a machine-readable storage device according to the teachings herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   collecting waveforms from an array of acoustic receivers in a borehole, the waveforms categorized by a receiver index and a depth index for the array, the array having a number of receivers at a number of depths;
   processing the waveforms to compute a beam-former to detect a reflection wave in the presence of a direct wave identified from the collected waveforms, the beam-former correlated to receiver and depth for the array defining a beam-space, wherein collecting and processing the wave forms comprises:
   transforming the collected waveforms from a time domain to a frequency domain;
   selecting a frequency band;
   detecting slowness of the direct wave as a function of frequency with respect to receiver slowness and depth slowness; and
   computing weights of the beam-former using the slowness of the direct wave;
   applying the beam-former to detect the reflection wave;
   separating the direct wave and the reflection wave to extract the reflection wave, after applying the beam-former to detect the reflection waves, the separating correlated to receiver and depth for the array; and
   using the extracted reflected wave to image, analyze, or image and analyze entities associated with the borehole.

2. The method of claim 1, wherein applying the beam-former includes computing an inner product of the weights and a vector of the waveforms correlated to receiver slowness and depth slowness.

3. The method of claim 2, wherein applying the beam-former to detect the reflection wave includes stacking the beam-space over frequency.

4. The method of claim 3, wherein separating the direct wave and the reflection wave includes applying a least squares inversion process.

5. The method of claim 3, wherein separating the direct wave and the reflection wave includes, for a reference depth, generating a frequency response using slowness of the direct and reflected waves such that the frequency response is a frequency response vector having direct wave and reflected wave components ordered according to power.

6. The method of claim 5, wherein generating the frequency response includes ordering the reflected wave components based on values of the beam-space at reflection peaks.

7. The method of claim 5, wherein the method includes adjusting the frequency response vector by reducing a matrix that generates the frequency response vector, if column vectors of the matrix are nearly co-linear at a specific frequency.

8. The method of claim 1, wherein the method includes using a monopole acoustic source or a dipole acoustic source to provide the collected waveforms.

9. A non-transitory machine-readable storage device having instructions stored thereon, which, when performed by a machine, cause the machine to perform operations, the operations comprising:
collecting waveforms from an array of acoustic receivers in a borehole, the waveforms categorized by a receiver index and a depth index for the array, the array having a number of receivers at a number of depths;
processing the waveforms to compute a beam-former to detect a reflection wave in the presence of a direct wave identified from the collected waveforms, the beam-former correlated to receiver and depth for the array defining a beam-space, wherein collecting and processing the waveforms comprises:
transforming the collected waveforms from a time domain to a frequency domain;
selecting a frequency band;
detecting slowness of the direct wave as a function of frequency with respect to receiver slowness and depth slowness; and
computing weights of the beam-former using the slowness of the direct wave;
applying the beam-former to detect the reflection wave;
separating the direct wave and the reflection wave to extract the reflection wave, after applying the beam-former to detect the reflection waves, the separating correlated to receiver and depth for the array; and
using the extracted reflected wave to image, analyze, or image and analyze entities associated with the borehole.

10. The non-transitory machine-readable storage device of claim 9, wherein applying the beam-former includes computing an inner product of the weights and a vector of the waveforms correlated to receiver slowness and depth slowness.

11. The non-transitory machine-readable storage device of claim 10, wherein applying the beam-former to detect the reflection wave includes stacking the beam-space over frequency.

12. The non-transitory machine-readable storage device of claim 11, wherein separating the direct wave and the reflection wave includes applying a least squares inversion process.

13. The non-transitory machine-readable storage device of claim 11, wherein separating the direct wave and the reflection wave includes, for a reference depth, generating a frequency response using slowness of the direct and reflected waves such that the frequency response is frequency response vector having direct wave and reflected wave components ordered according to power.

14. The non-transitory machine-readable storage device of claim 13, wherein generating the frequency response includes ordering the reflected wave components based on values of the beam-space at reflection peaks.

15. The non-transitory machine-readable storage device of claim 13, wherein the instructions to perform operations include operations including adjusting the frequency response vector by reducing a matrix that generates the frequency response vector, if column vectors of the matrix are nearly co-linear at a specific frequency.

16. The non-transitory machine-readable storage device of claim 9, wherein the instructions to perform operations include operations including using a monopole acoustic source or a dipole acoustic source to provide the collected waveforms.

17. A system comprising:
an acoustic tool having a transmitter and an array of acoustic receivers, the array having a number of receivers at a number of depths;
a control unit operable to manage generation of acoustic signals from the transmitter and to manage collection of received signals at the receivers; and
a processing unit, wherein the processing unit is arranged to:
collect waveforms from the array of acoustic receivers in a borehole, the waveforms categorized by a receiver index and a depth index for the array;
process the waveforms to compute a beam-former to detect a reflection wave in the presence of a direct wave identified from the collected waveforms, the beam-former correlated to receiver and depth for the array defining a beam-space, wherein collecting and processing of the waveforms comprises:
transforming the collected waveforms from a time domain to a frequency domain;
selecting a frequency band;
detecting slowness of the direct wave as a function of frequency with respect to receiver slowness and depth slowness; and
computing weights of the beam-former using the slowness of the direct wave;
apply the beam-former to detect the reflection wave;
separate the direct wave and the reflection wave to extract the reflection wave, after applying the beam-former to detect the reflection waves, the separating correlated to receiver and depth for the array; and
use the extracted reflected wave to image, analyze, or image and analyze entities associated with the borehole.

18. The system of claim 17, wherein application of the beam-former includes computation of an inner product of the weights and a vector of the waveforms correlated to receiver slowness and depth slowness.

19. The system of claim 18, wherein application of the beam-former to detect the reflection wave includes stacking of the beam-space over frequency.

20. The system of claim 19, wherein separation of the direct wave and the reflection wave includes application of a least squares inversion process.

21. The system of claim 19, wherein separation of the direct wave and the reflection wave includes, for a reference depth, generation of a frequency response by use of slowness of the direct and reflected waves such that the frequency response is frequency response vector having direct wave and reflected wave components ordered according to power.

22. The system of claim 21, wherein generation of the frequency response includes an ordering of the reflected wave components based on values of the beam-space at reflection peaks.

23. The system of claim 21, wherein the processing unit arranged to adjust the frequency response vector by reduction of a matrix that generates the frequency response vector, if column vectors of the matrix are nearly co-linear at a specific frequency.

24. The system of claim 17, wherein the transmitter includes a monopole acoustic transmitter or a dipole acoustic transmitter.

* * * * *